United States Patent [19]

Popa et al.

[11] Patent Number: 5,991,783
[45] Date of Patent: Nov. 23, 1999

[54] SYSTEM AND METHOD FOR GENERATING, STORING AND TRANSMITTING GRAPHICAL DATA

[75] Inventors: Sorin Popa, North York; Giancarlo D'Ulisse, Willowdale, both of Canada

[73] Assignee: Warp 10 Technologies Inc., Richmond Hill, Canada

[21] Appl. No.: 08/724,458

[22] Filed: Oct. 1, 1996

[51] Int. Cl.[6] ............................................ G06F 17/21
[52] U.S. Cl. ................................ 707/522; 707/527
[58] Field of Search ............................ 707/522, 527, 707/528; 358/538, 540, 527, 524, 523; 345/431, 154; 355/40, 27, 31; 395/109; 430/318; 396/318, 310, 319

[56] References Cited

U.S. PATENT DOCUMENTS

| | | | |
|---|---|---|---|
| 4,817,050 | 3/1989 | Komatsu et al. | 364/900 |
| 4,956,703 | 9/1990 | Uzuda et al. | 358/76 |
| 5,169,827 | 12/1992 | Takanashi et al. | 503/27 |
| 5,617,178 | 4/1997 | Goggins | 355/22 |

*Primary Examiner*—Joseph H. Feild
*Assistant Examiner*—Cong-Lac Huynh
*Attorney, Agent, or Firm*—Bereskin & Parr

[57] ABSTRACT

A system and method for generating, storing and transmitting a layout page containing graphical data correlated to at least one graphical image which has previously been graphically encoded, such that the layout page may be printed either as a complete, full-color image, or as individual color separation plates. The system and method create a set of master data files, having a main master file which stores complete RGB color data for the graphical image, and a correlated set of CMYK master files, each containing graphical data for a single color separation plate for the graphical image. The main master file contains pointers to each of the CMYK master files. The system and method also create a set of preview data files: a set of CMYK preview files essentially only containing a pointer to the corresponding CMYK master file, and a main preview file essentially only containing a pointer to the main master file, and pointers to each of the CMYK preview files.

13 Claims, 21 Drawing Sheets

SYSTEM AND METHOD FOR GENERATING, STORING AND TRANSMITTING GRAPHICAL DATA

FIELD OF THE INVENTION

This invention relates to the desktop publishing industry, and more particularly, to systems and methods for efficiently transmitting graphical data to printing devices.

BACKGROUND OF THE INVENTION

In the desktop publishing industry, two different types of formats for storing graphical data have become widely accepted: EPS (encapsulated postscript) RGB (Red, Green, Blue) and DCS (desktop colour separation). These nomenclatures are somewhat misleading in that DCS data files are, in fact, a class of encapsulated postscript files. Although there are variations in the way in which graphical data is stored in these formats, generally EPS (RGB) files contain complete RGB (Red, Green, Blue) colour data for a graphical image within a single data file, while DCS files frequently utilize four CMYK (Cyan, Magenta, Yellow, black) colour plate files, each containing data for a single colour only.

These formats have been developed, in part, as a result of the different types of printing devices utilized in the desktop publishing industry. Colour printers, which print on paper, typically recognize EPS (RGB) files and print a single, complete colour image. Imagesetters, on the other hand, recognize DCS files and print a colour plate on celluloid film corresponding to each of the CMYK files. These film plates are then utilized at the final printing stage to produce high, magazine-quality, full-colour images on paper. Colour printers are relatively inexpensive and fast when compared with imagesetters, but the image quality produced is considerably lower than the image quality of pictures generated using imagesetter film plates. As a result, colour printers are generally used to produce drafts of a particular graphics layout, while the final product is printed on an imagesetter.

One difficulty which the desktop industry faces, therefore, is the fact that two sets of graphics files must be produced in parallel for a single graphics layout, often containing several graphic images—one set in EPS (RGB) format to enable drafts to be printed on a colour printer, and one in DCS format to enable final film plates to be created on an imagesetter. Accordingly, if one set of the graphics files is changed, the other set must be similarly changed to ensure that parity remains between the two sets. Since an image is often subject to numerous revisions, this leads to considerable complexity. Where, as is often the case, different people are working on an image, it can be difficult to ensure that both files are always consistent with one another.

Another difficulty for the desktop industry is that high quality graphics layout files take up a tremendous amount of storage space which accordingly require lengthy amounts of time to transmit. As a result, a layout designer's computer is often tied up for a considerable time while the computer transmits the layout file data to a particular printing device or spooler. The layout designer is unable to perform any productive work on the computer during this transmittal process, thereby resulting in inefficient use of the layout designer's time.

Accordingly, the present inventors have recognized a need for systems and methods which enable a layout designer to efficiently generate a graphics layout, and transmit it to be printed out at either a colour printer or an imagesetter so that the layout designer's computer is freed up to perform other work in as short a time as possible.

SUMMARY OF THE INVENTION

The present invention relates to a system for generating, storing and transmitting graphical data correlated to at least one graphical image which has previously been graphically encoded.

The system has data storage for storing data files containing graphical data. The system also has a graphics manipulator for inputting and manipulating the graphical data representing the original graphical image to create manipulated or modified graphical data for a new graphical image. The graphics manipulator contains a master data file generator for generating a master data file comprising the manipulated graphical data and storing the master data file in the data storage means. The graphics manipulator also contains a preview data file generator for generating a preview data file correlated to the master data file and storing the preview data file in the data storage. Each such preview data file contains a pointer pointing to the master data file. Preferably, a layout page creator creates and outputs layout page data containing data correlated to the preview data file. The system also has a spooler which receives the layout page data and creates adjusted layout page data by replacing the data correlated to the preview data file and contained within the layout page data with data correlated to the master data file, and outputs the adjusted layout page data.

The system may also comprise a printing device operationally connected to the spooler for receiving the adjusted layout page data and printing a layout page correlated to the adjusted layout page data.

The master data file generator generates a composite data file containing complete colour data correlated to the graphical image. Also, the master data file generator generates a plurality of colour plate data files, and stores a plurality of pointers in the composite data file, each pointing to a different one of the colour plate data files. The preview data file generator generates a preview colour plate data file for each colour plate data file, such that each preview colour plate data file contains a pointer pointing to the correlated colour plate data file and also generates a master preview file containing a pointer pointing to the composite data file and a plurality of pointers each pointing to a different one of the preview colour plate data files.

In accordance with the present invention, there is provided a computer readable storage medium including an image stored thereon in two different data storage formats, wherein the image is stored in a first file including the image stored in a first format and a second file in which the image is stored in a second format wherein the first file includes a first pointer for the second file and pointing to the second file, and wherein the first and second files behave as a single file and, for each application, an appropriate one of the first and second files is selected and read, and wherein the first and second formats of the image are closely associated with one another and the first file has a size not substantially different from a file including just the image stored in the first format.

The storage medium includes a plurality of second files in which the image is stored in the second format, with any one of the portion of an image being divided between the second files and a plurality of first pointers pointing to the second files.

Another aspect of the present invention provides a system for generating, storing and transmitting graphical data of an image, the system comprising:

(a) data storage means for storing the graphical data;

(b) graphics manipulation means operationally connected to the data storage means for inputting and manipulating the graphical data to create modified graphical data, comprising:
  (i) means for inputting and outputting the graphical data to and from the graphics manipulation means;
  (ii) data manipulation means for manipulating and modifying the graphical data;
  (iii) master data file generating means for generating a master data file comprising the manipulated graphical data and storing the master data file in the data storage means as a first file including the image stored in a first format and a second file including the image stored in a second format, wherein the first file includes a first pointer pointing to the second file and wherein the first and second files behave as a single file and, for each application, an appropriate one of the first and second files is selected and read.

A further aspect of the present invention provides a method of generating and storing graphical data of an image, the method comprising the following steps:
  (1) inputting the graphical data and generating a file including the image stored in a first file format;
  (2) generating a file comprising the image stored in a second format;
  (3) providing a pointer in the first file pointing to the second file; and
  (4) modifying the first file so that the first and second files behave as a single file and, for each application, an appropriate one of the first and second files is selected and read.

In all aspects of the present invention, the second file comprises a plurality of colour plate data files, in which each colour plate data file comprises data corresponding to the image and corresponding to a set colour from a set of basic colours. On the storage medium, there is included a preview file, which preview file includes a main master file pointer pointing to the main master file and a plurality of second pointers, each of which points to a respective one of the second files.

Preferably, for the system and method of the present invention, there is provided a layout page creation means operationally connected to the data storage means for creating and outputting layout page data comprising data obtained from preview data files; and a spooling means operationally connected to the layout page creation means for receiving layout page data and creating adjusted layout page data by replacing data received from the preview data file with data from one of the first file and the second files, and for outputting the adjusted layout page data. The system preferably includes a main computer means operationally connected to the various elements of the system for control thereof.

In the preferred aspect of the invention, the spooling means is connected to a printing means comprising at least one printing device selected from the set comprising printers and imagesetters. Further, the image can then be stored in the EPS format as the first format, and, in the second format as a set of DCS data files. The first or EPS format can be used for printing on a printer, while the DCS files can be used for printing on the imagesetter.

Also, the system may comprise apparatus for compressing the graphical data, and subsequently decompressing the graphical data for printing.

BRIEF DESCRIPTION OF THE DRAWINGS

The present invention will now be described, by way of example only, with reference to the following drawings, in which.

DETAILED DESCRIPTION OF THE PREFERRED EMBODIMENT

Figure 1:
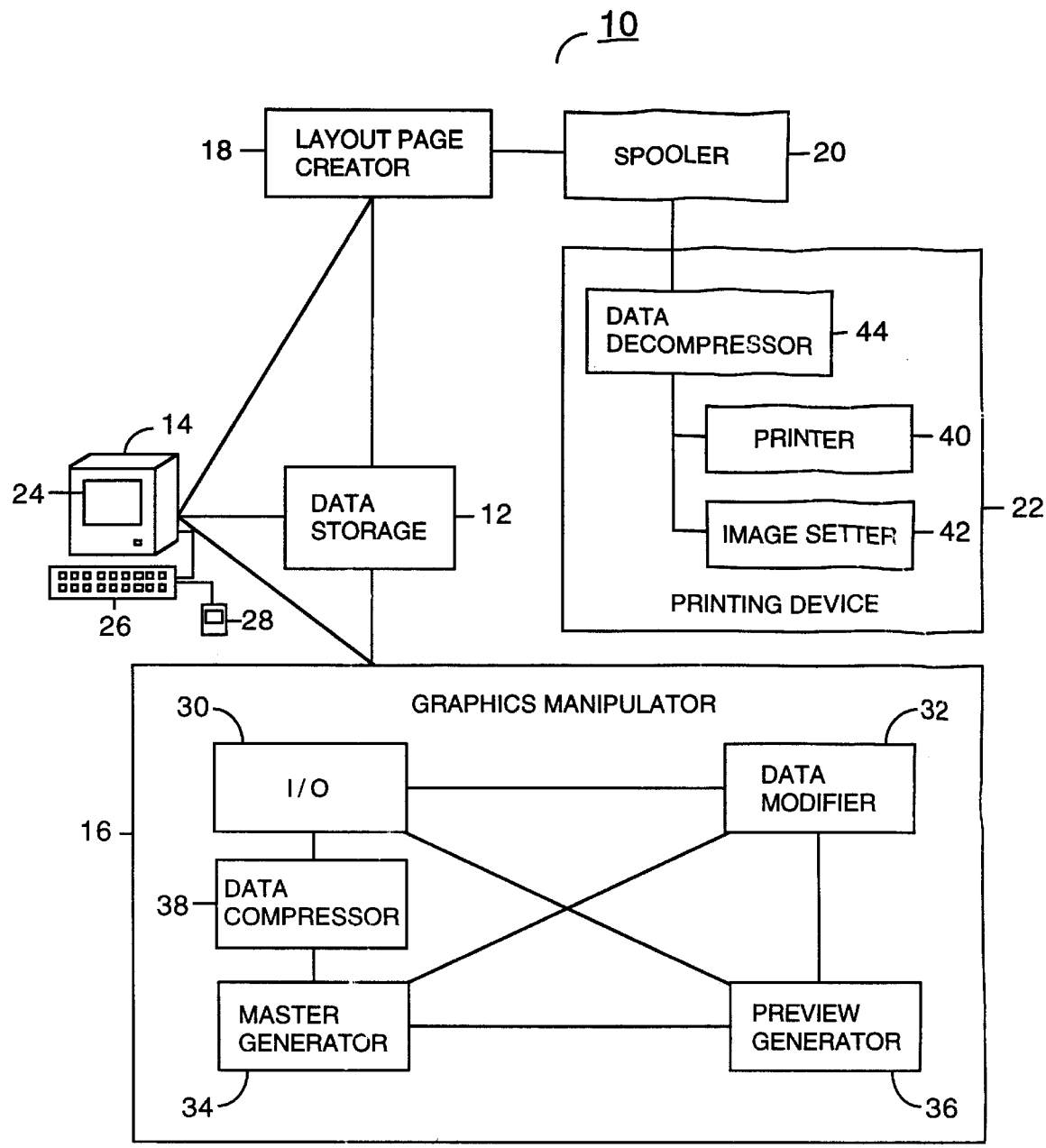
FIG. 1 is a schematic diagram of the components of the subject invention.

Referring to FIG. 1, illustrated therein is a graphics system shown generally as 10 made in accordance with a preferred embodiment of the subject invention. Graphics system 10 comprises data storage 12, computer 14, graphics manipulator 16, layout page creator 18, spooler 20, and a printing device 22.

Data storage 12 stores graphical data files, typically either in RAM, or in longer term storage such as on hard disk, floppy disk, or compact disc. Computer 14 comprises a computer screen 24 for displaying to a user graphical data as received from data storage 12, the graphics manipulator 16, or the layout page creator 18, and input devices such as a keyboard 26 and a mouse 28 for providing instructions to the system 10. In addition, computer 14 typically has a CPU (Central Processing Unit) (not shown), as well as RAM (Random Access Memory) (not shown) and ROM (Read Only Memory) memory storage (not shown) and long term memory storage such as a hard drive, floppy disk drive, and compact disc drive (not shown). Although data storage 12 may be contained within the computer's 14 memory, for larger networked systems 10, data storage 12 may comprise a remote storage apparatus such as an external hard drive.

Graphics manipulator 16, typically in the form of software such as Adobe PhotoShop® supplied by Adobe Systems Incorporated and resident on computer 14, is electronically coupled to data storage 12 in order to be capable of retrieving graphical data stored in graphical data files. Graphics manipulator 16 is capable of modifying a graphical image in accordance with instructions inputted by the user. Typically, such modification capabilities include cropping an image, rotating all or part of an image, duplicating all or part of an image, sharpening an image, blurring an image, adjusting the image resolution, colour correcting, and adding text to an image. Preferably, graphics manipulator 16 comprises input/output (I/O) means 30 for communicating graphical data to and from the data storage 12 and the computer 14, and a data modifier 32 for performing the necessary modifications to the graphical data as instructed by the user. Graphics manipulator 16 also has a master data file generator 34 for generating and storing in the data storage 12 master data files correlated to the modified graphical data. A preview data file generator 36 generates and stores one preview data file for and corresponding to each master data file. In a preferred embodiment, graphics manipulator 16 includes a data compressor 38 for compressing the modified graphical data prior to its being stored in the data storage 12.

Layout page creator 18, also typically in the form of software such as QuarkXPress® supplied by Quark Inc. and resident on computer 14, is electronically coupled to the data storage 12 to enable layout page creator 18 to communicate graphical data to and from the data storage 12. Preferably, layout page creator 18 is capable of combining text and various graphical images stored in data files such as those generated by the graphics manipulator 16 in accordance with instructions inputted by the user, to generate a layout page.

Spooler 20 is operationally connected to the layout page creator 18, and receives layout page data from the layout page creator 18. Typically, spooler 20 comprises a CPU (not shown) with software programmed to function in accordance with the computer algorithm outlined below, causing spooler 20 to modify the layout page data. In turn, spooler 20 communicates the modified layout page data to the printing device 22. In the preferred embodiment, the modified layout page data may be directed to either a printer 40 or an imagesetter 42, depending on the type of printout desired. Also, preferably the printing device 22 includes a data decompressor 44 which decompresses the data originally compressed by data compressor 38. Typically, data decompressor 44 will comprise firmware which is built into both printer 40 and imagesetter 42.

Figure 2A:
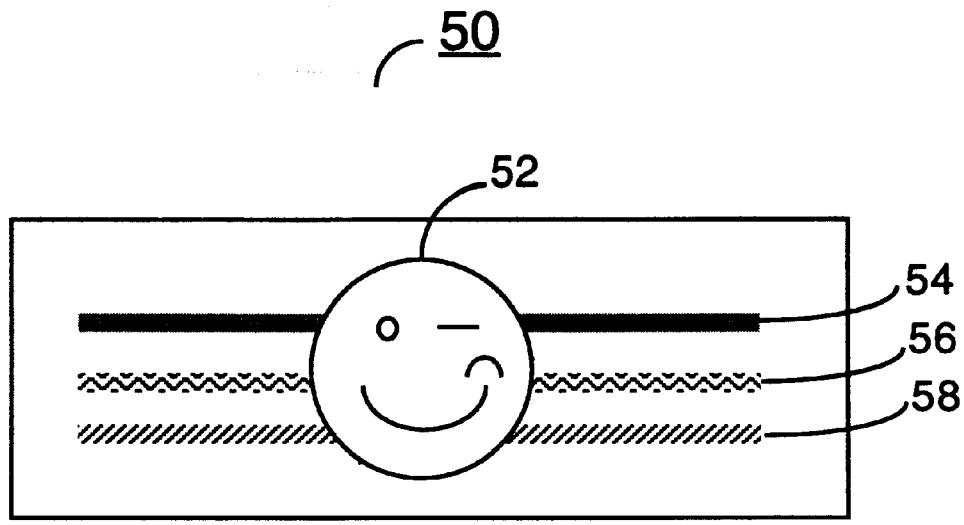
FIG. 2a is an example of a graphical image used in connection with the subject invention.
Figure 3:
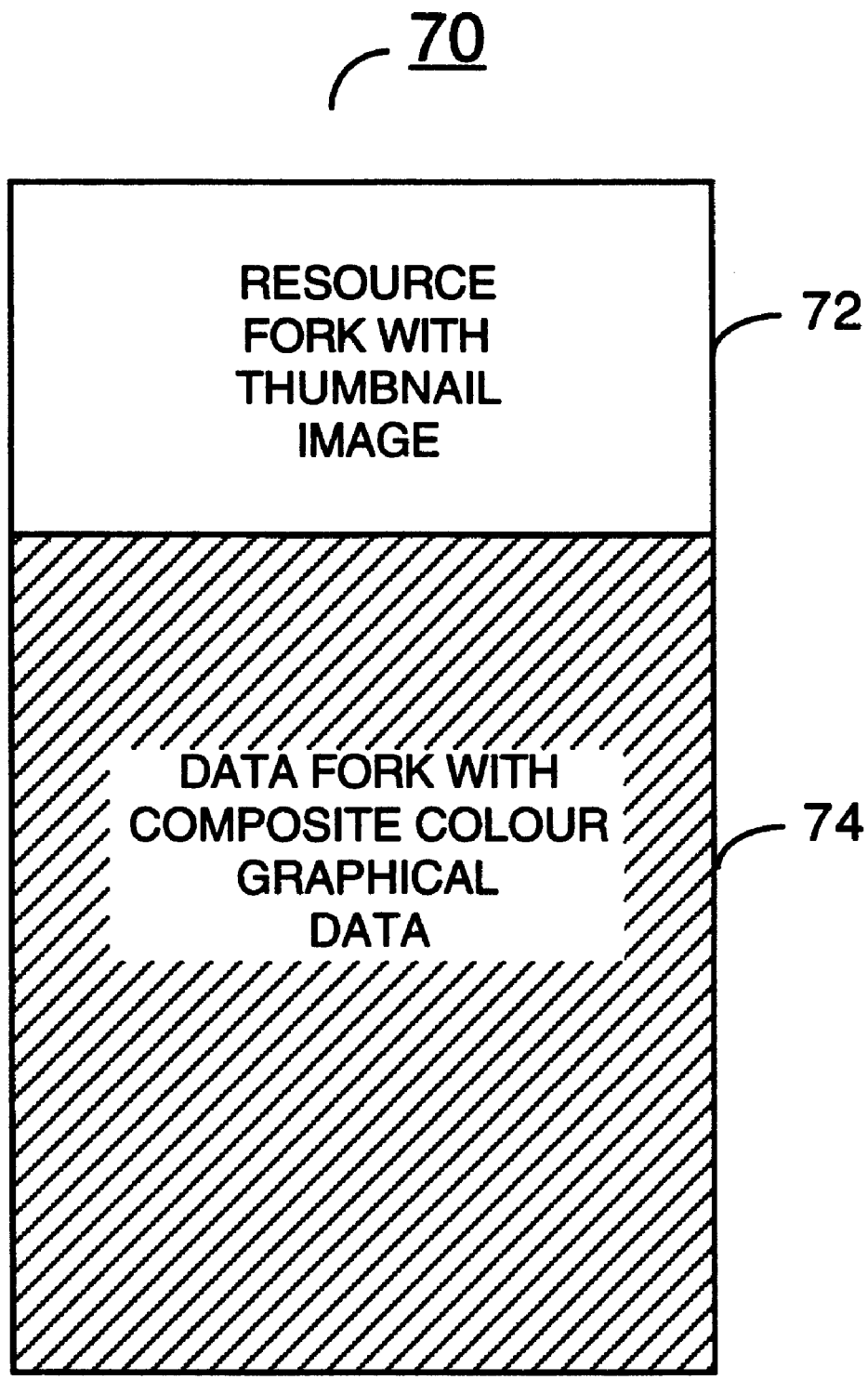
FIG. 3 is a schematic diagram of a graphical data file storing graphical data in an EPS (RGB) format correlated to the modified graphical image of FIG. 2b.

FIG. 3 depicts a conventional EPS (RGB) format graphics file referred to generally as 70, containing graphics data correlated to the image 50 illustrated in FIG. 2a. EPS (RGB) graphics file 70 typically contains a resource fork 72 containing resource information as well as data correlated to the low resolution thumbnail of the image 50, and a data fork 74 containing high resolution composite RGB colour graphical data correlated to the image 50. In general, a resource fork and data fork may be stored contiguously on one data storage device forming a single file, or may be stored separately as two files. For ease of explanation, in this disclosure, a resource fork and correlated data fork will be considered to form a single graphics file.

Figure 4:
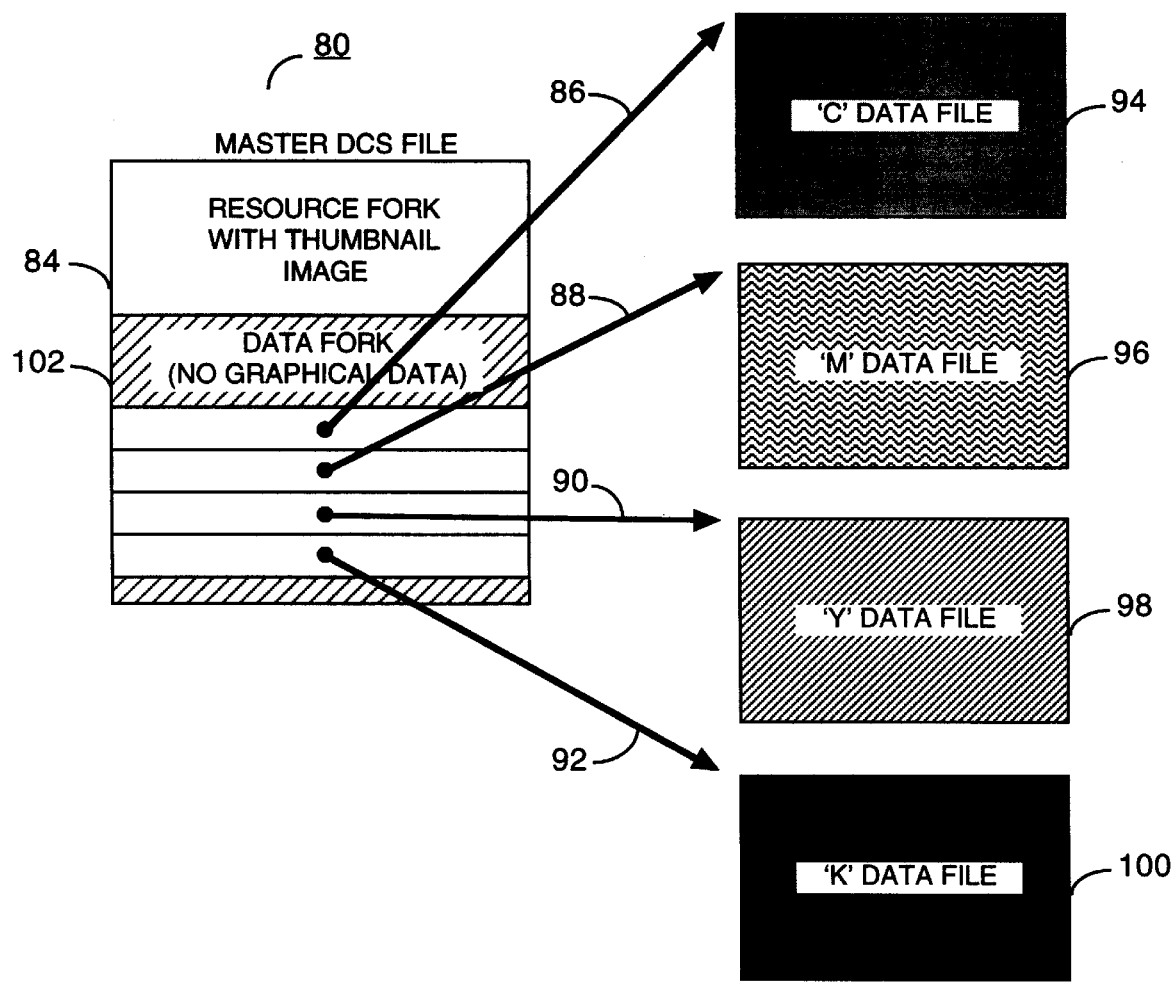
FIG. 4 is a schematic diagram of graphical data files storing graphical data in a DCS format correlated to the modified graphical image of FIG. 2b.

FIG. 4 depicts a set of conventional DCS graphics files which are considered to form one file of a single image and referred to generally as 80, containing graphics data correlated to a graphical image, such as the image 50 illustrated in FIG. 2a, stored in a standard DCS format and not generated in accordance with the present invention. Set 80 contains a master DCS file 82 containing a resource fork 84 which contains resource information, and, in a data fork 102, pointers 86,88,90 and 92 pointing to cyan colour separation plate data file 94, magenta colour separation plate data file 96, yellow colour separation plate data file 98, and black colour separation plate data file 100 respectively. Colour separation plate data files 94, 96, 98 and 100 each contain high resolution graphics data correlated to their respective colour separation of the image 50. Master DCS file 82 also contains a data fork 102 which is essentially empty of data apart from the pointers 86–92.

FIGS. 8A–8J illustrate the steps of the method 200 carried out by system 10 made in accordance with the subject invention. Utilizing the graphics manipulator 16, a user retrieves from data storage 12 and opens a previously-stored graphics file (Block 202) correlated to an image 50 such as that illustrated in FIG. 2a. Image 50 depicts a basic colour image having a face 52 drawn in black with a cyan coloured line 54, a magenta coloured line 56, and a yellow coloured line 58 in the background. Although most colour images utilize combinations of the basic colour elements cyan, magenta, yellow and black (or alternatively red, green and blue) to produce various hues, for explanation purposes, each of the items 52, 54, 56, and 58 depicted in the image 50 is composed solely of the respective basic colour. Typically, image 50 has been either computer-generated, scanned from an original photograph, or scanned using an electronic camera, and stored as a graphics file in data storage 12.

The graphics manipulator 16 then determines whether the graphics file is stored in a DCS format (Block 204). It is assumed that the original file is in either EPS or DCS format. If the original file is just in EPS format, the graphics file is converted and a new DCS format file for the image 50 is generated (Block 206) and stored in RAM in data storage 14 together with the original EPS file. Graphics manipulator 16 then determines whether the graphics file contains a thumbnail or preview image (Block 208). High-resolution graphics files typically require a tremendous amount of data. Computer screens 24 display images in comparatively low resolution. Accordingly, for efficiency purposes, a low resolution version of the image 50, referred to as a thumbnail or preview image, is stored in the graphics file along with the high resolution version, which enables the user to see the image 50 on the computer screen 24 for positioning and other modification purposes. If the graphics file does not contain a thumbnail, graphics manipulator 16 generates a low resolution version of the image 50 which is included in the graphics file (Block 210). Typically, the thumbnail is stored in a 72 dpi (Dots Per Inch) or JPEG data compressed format using commonly known techniques. It is commonly stored in the EPS (RGB) format for ease of compatibility with common computer monitors. Finally, graphics manipulator 16 determines whether the graphics file has been stored in an EPS (RGB) format (Block 212). If not, i.e. if the original file was just a DCS file, the graphics file is converted to an EPS (RGB) format and stored in RAM in data storage 14 (Block 214) with the original DCS file. Thus, whatever the format of the original file, there will then be two versions of the file, one in EPS and one in DCS.

Figure 2B:
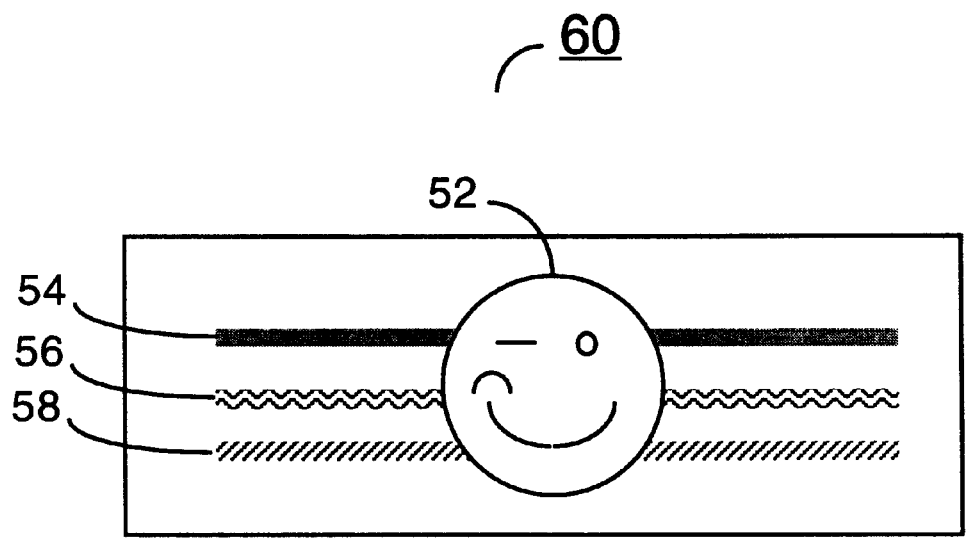
FIG. 2b is an example of the graphical image of FIG. 2a modified in accordance with the subject invention.

Once the graphics file has been properly formatted, the user is permitted to modify the image 50 as desired, the modified graphics file being stored in temporary storage such as RAM in data storage 14 (Block 216). As indicated above, the user may perform such modifications as cropping the image, rotating the image or parts thereof, adjusting the colouring, adjusting the resolution, and adding text. Each of these types of modification are performed on the graphics file by graphics manipulator 16 using known techniques. Each of these instructions is input to the graphics manipulator 16 by the user utilizing such input devices as a keyboard 26 and mouse 28. FIG. 2b depicts modified image 60 which is a mirror image of image 50 as modified by the user. Numbered elements in FIG. 2b correspond to identically numbered elements in FIG. 2a.

Figure 5:
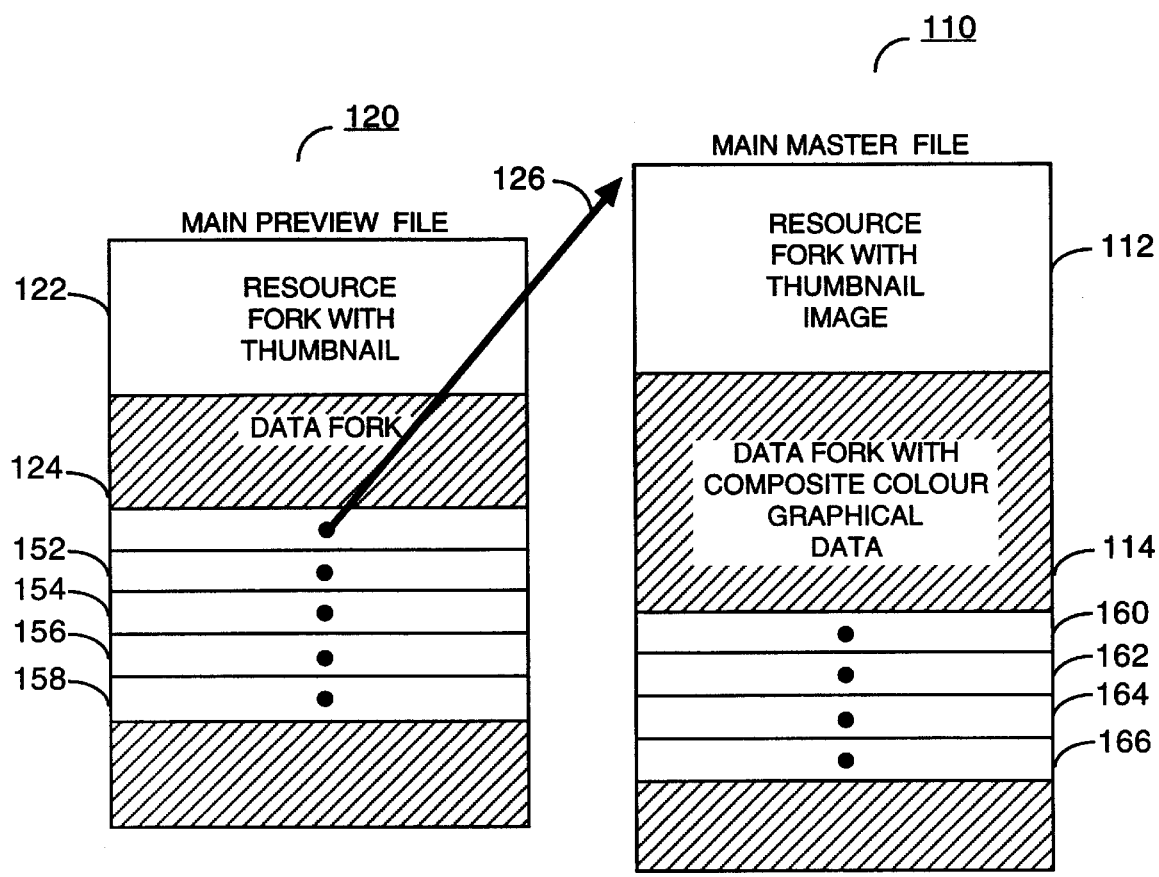
FIG. 5 is a schematic diagram of a master file storing graphical data correlated to the modified graphical image of FIG. 2b and a correlated preview file generated in accordance with the subject invention.

Referring now to FIG. 5, the master generator 34 then begins the process of generating a main master file 110 (Block 219) by retrieving formatting information from the resource fork 72 of EPS (RGB) format graphics file 70 (Block 220). The graphics manipulator 16 then retrieves the RGB colour graphic data correlated to the modified image 60, as stored in Block 216 (Block 222). A thumbnail of the modified image 60 is then generated (Block 224). Data compressor 38 compresses the RGB colour graphic data using JPEG or another similarly known and widely used compression algorithm (Block 226). Graphics manipulator 16 then saves a main master file 110 having a resource fork 112 and a data fork 114 in data storage 14 (Block 228). Resource fork 112 contains postscript file formatting information comprising a portion of the formatting information retrieved in Block 220, the thumbnail generated in Block 224, and a copy of all resources contained in the resource fork 72 of EPS (RGB) format graphics file 70. Data fork 114 contains the compressed RGB data and a postscript end of file marker, as well as C, M, Y and K master file pointers 160, 162, 164 and 166, which are initially set to null.

Figure 8A:
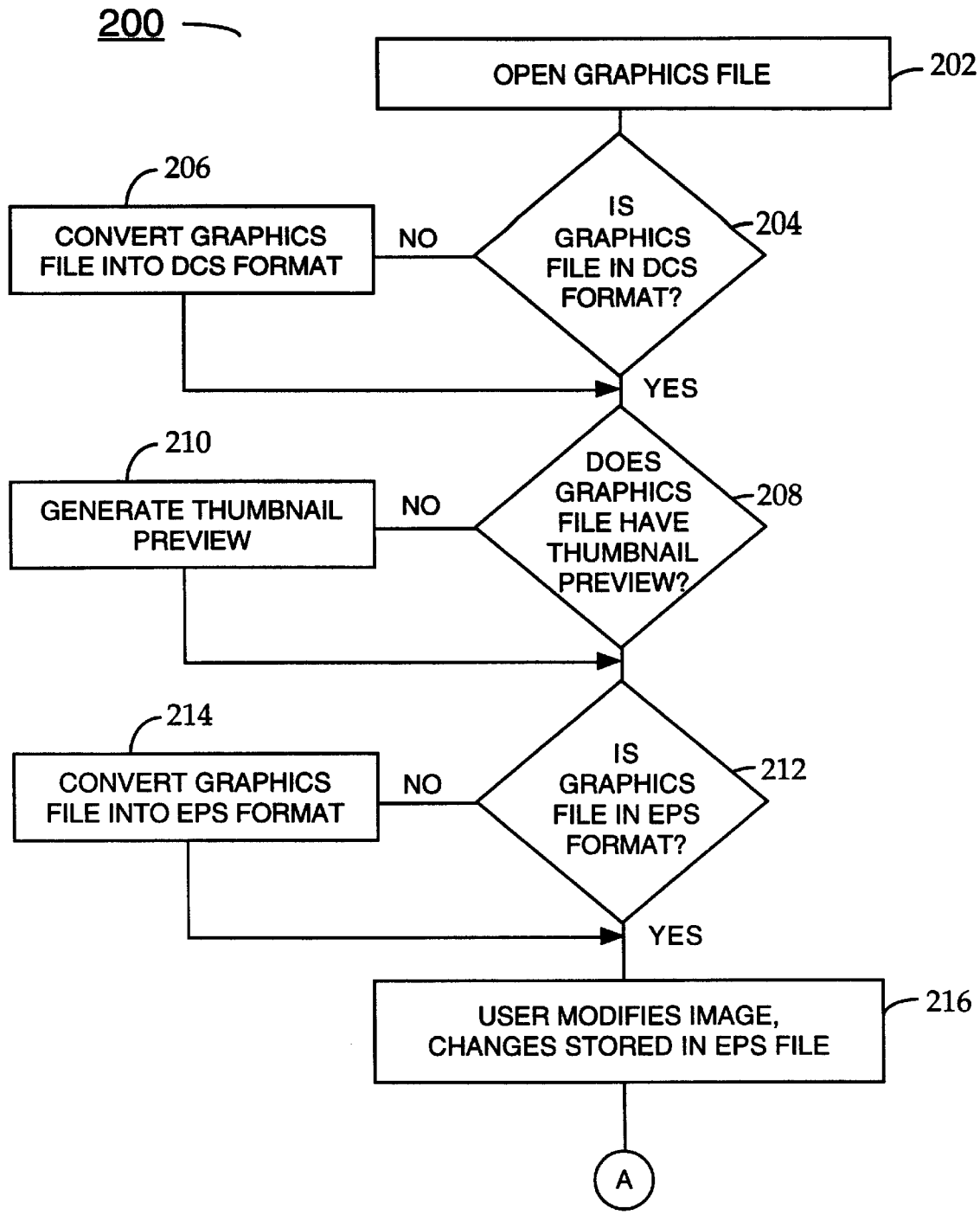
FIGS. 8A–8J together comprise a logical flow diagram of a computer algorithm operating in accordance with the subject invention.
Figure 8B:
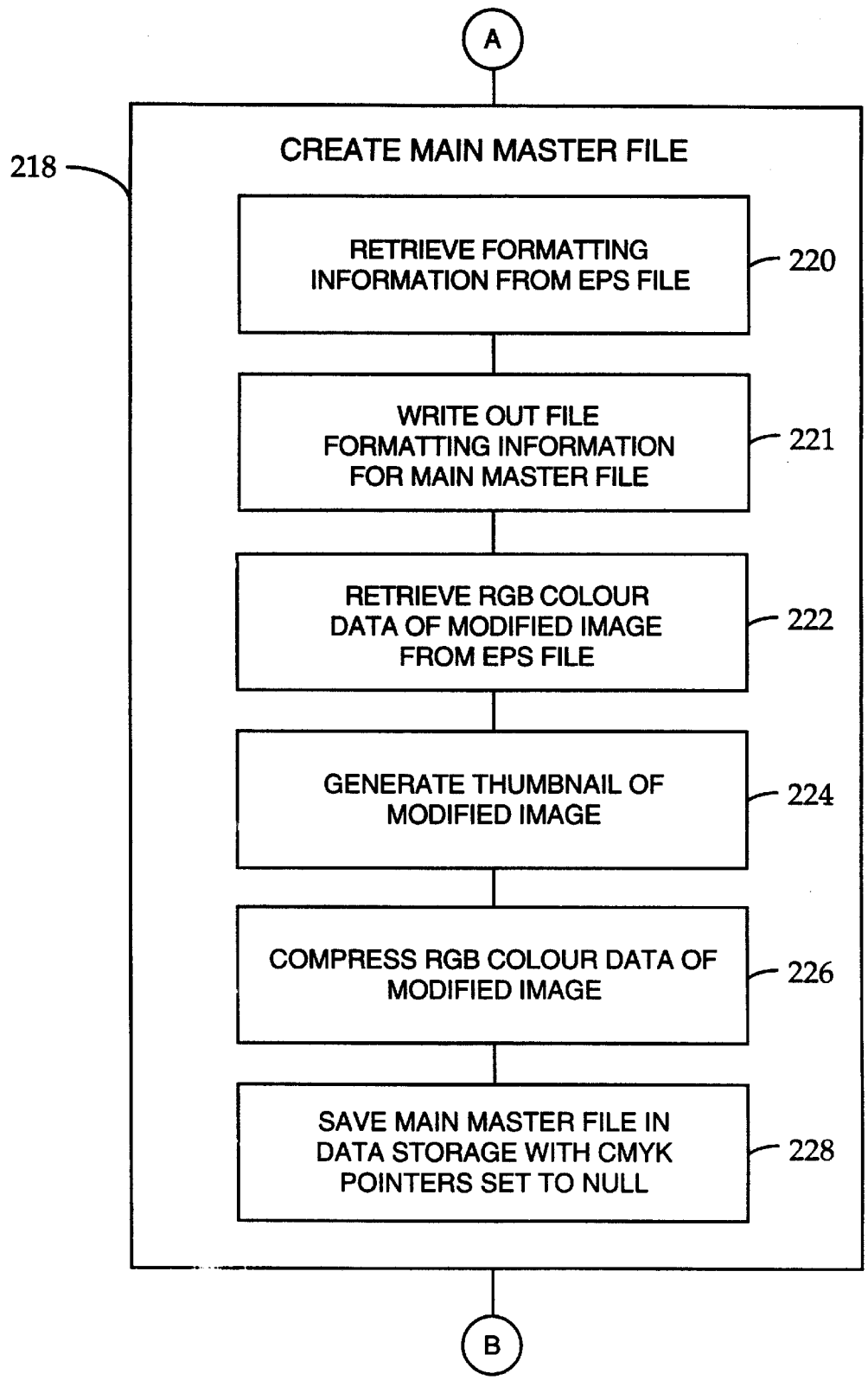
Figure 8C:
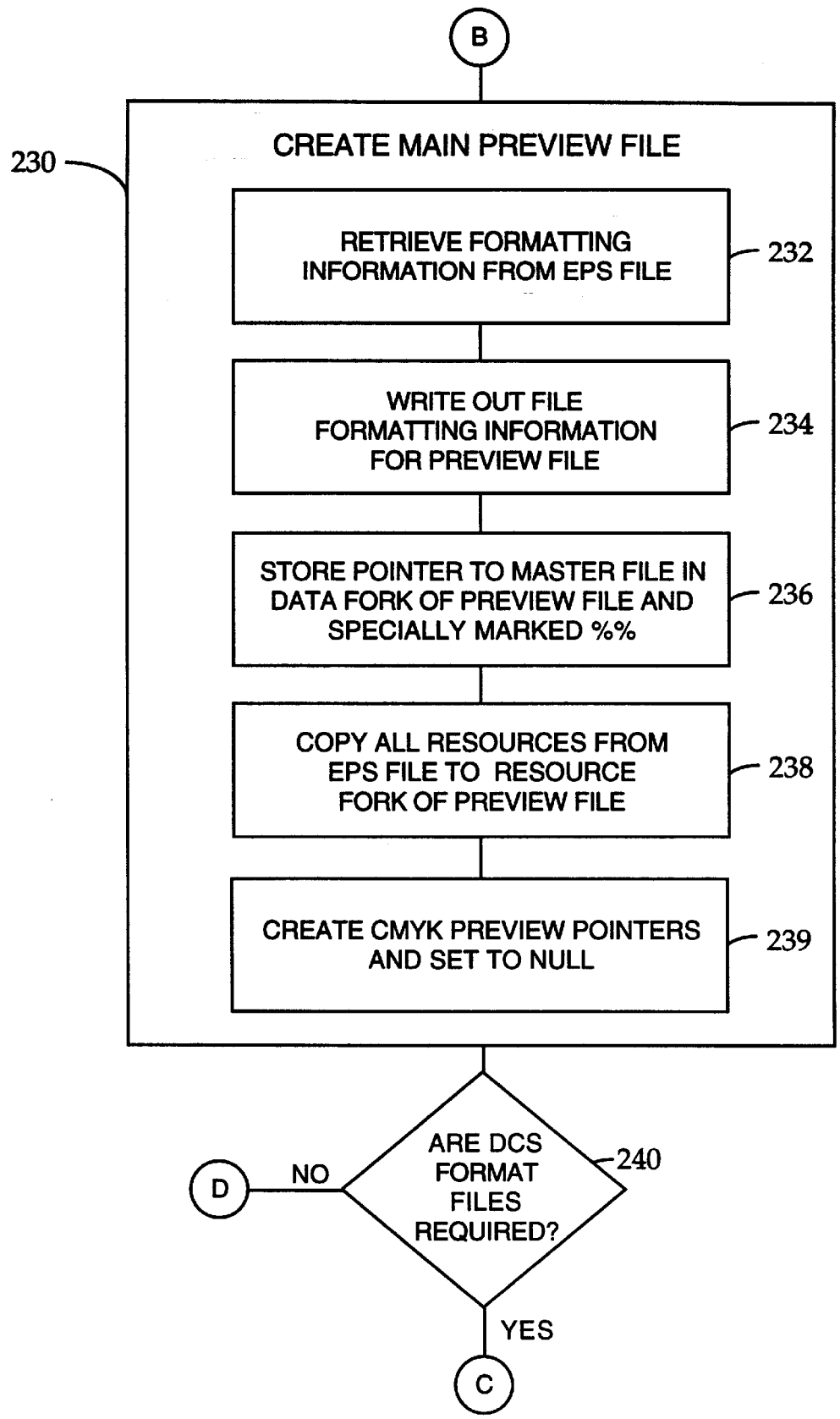

As shown in FIG. 8C, the preview generator 36 then begins the process of generating a main preview file, referred to generally as 120 (Block 230). Formatting information is retrieved from the from the EPS (RGB) format graphics file 70 (Block 232). Postscript file formatting information for the main preview file 120 is then written to the data storage 14, which includes some of the formatting information retrieved in the Block 232, and a resource fork 122 and data fork 124 are initialized (Block 234). The preview generator 36 then stores a pointer 126 pointing to the main master file 110, in the data fork 124 specially marked with a "% %" indicator (Block 236). All resources, including the thumbnail, are copied from the resource fork 112 of the main master file 110 to the resource fork 122 of the main preview file 120 (Block 238). The preview generator 36 then creates C, M, Y and K preview file pointers 152, 154, 156 and 158, and again these are initially set to null (Block 239).

The graphics manipulator 16 then determines from the user if DCS format files corresponding to the modified graphic image 60 are required (Block 240). If not, the graphics manipulator 16 has completed its task, and the algorithm skips to Block 272 (FIG. 8F).

Figure 6:
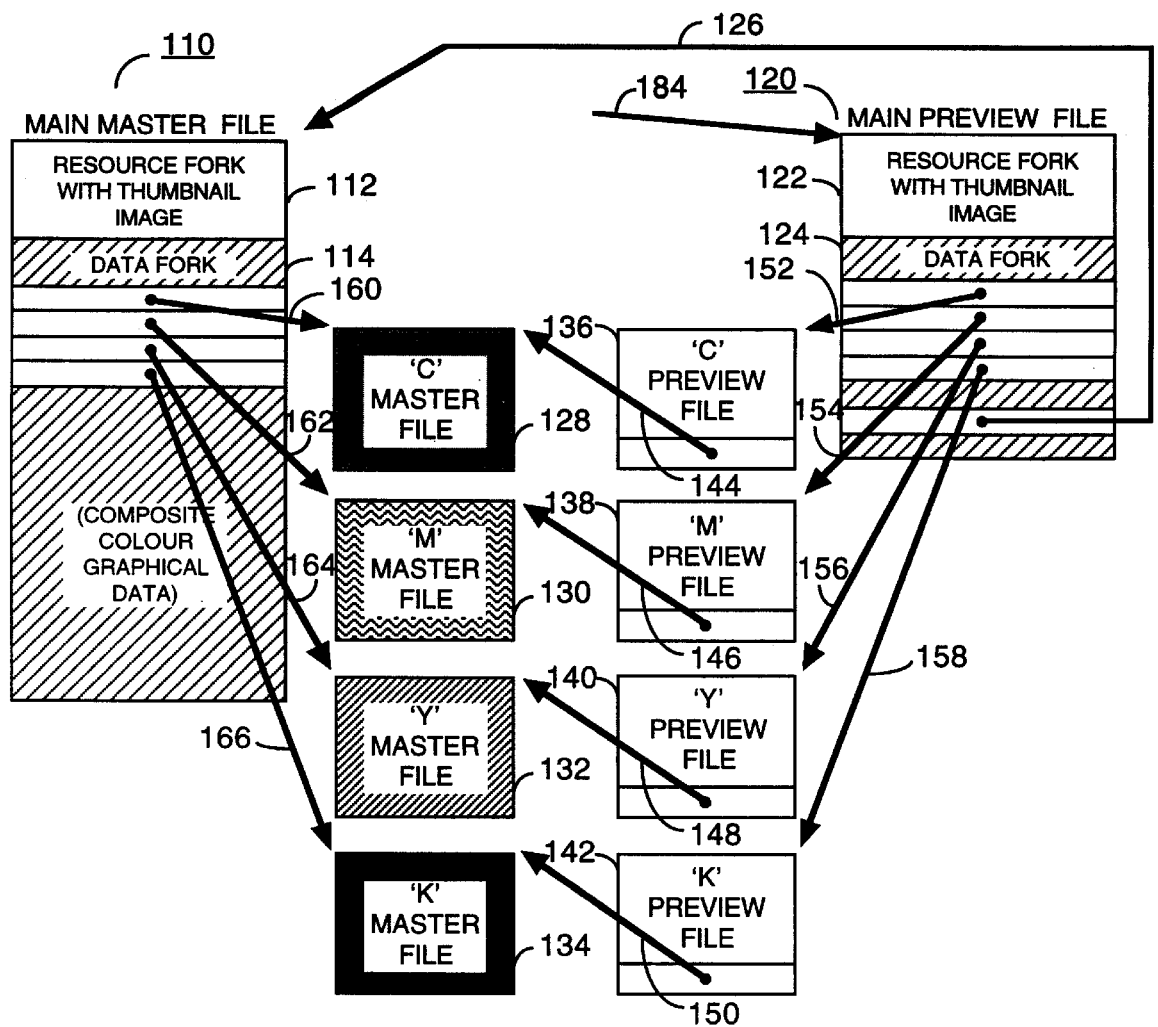
FIG. 6 is a schematic diagram of master files storing graphical data correlated to the modified graphical image of FIG. 2b and correlated preview files generated in accordance with the subject invention.
Figure 8D:
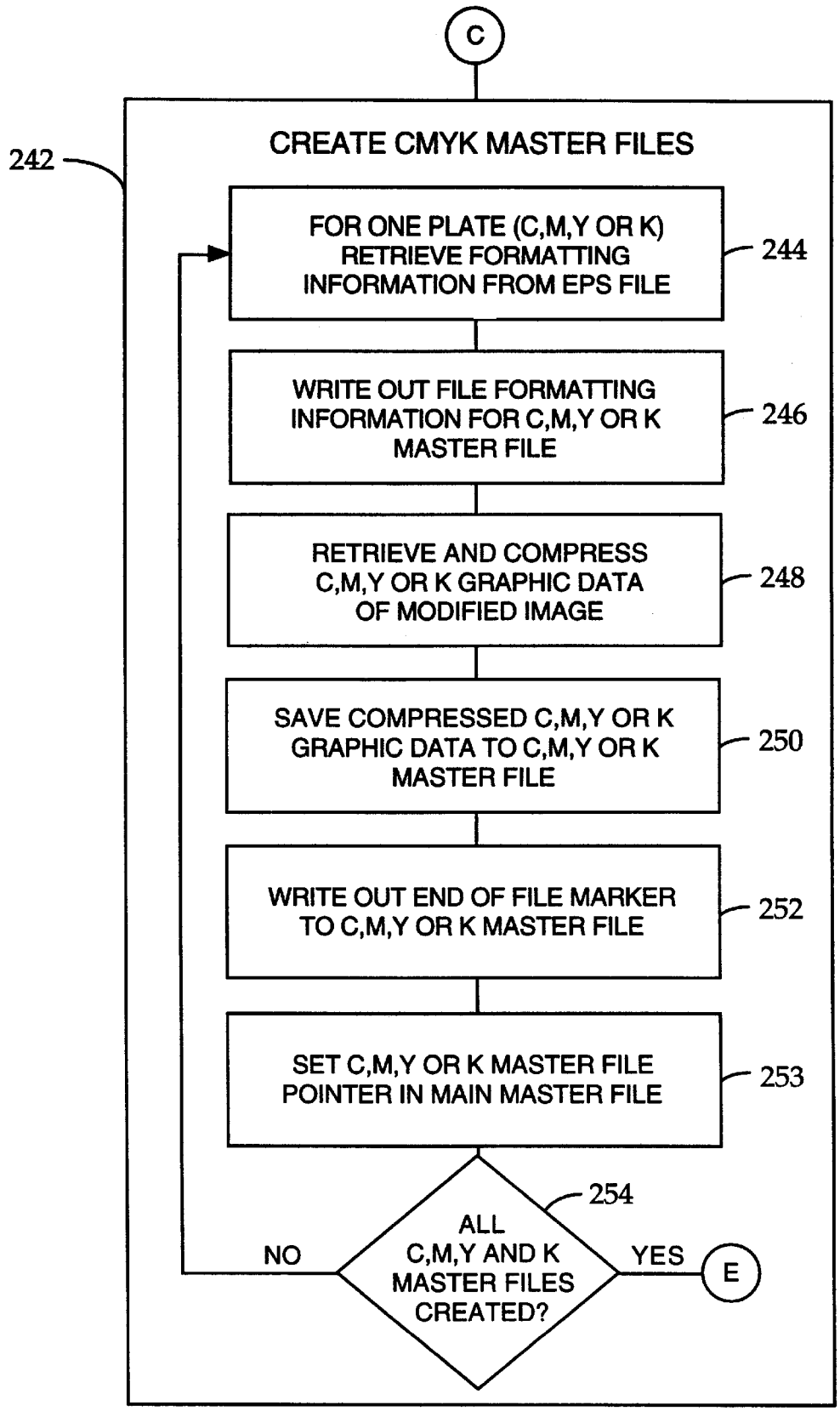

If DCS format files are required, as shown in FIGS. 6 and 8D, master generator 34 begins the process of generating DCS master files (C master file 128, M master file 130, Y master file 132, K master file 134) for each CMYK colour plate (Block 242). For one DCS master file (128, 130, 132 or 134), master generator 34 retrieves formatting information from the EPS (RGB) format graphics file 70 (Block 244). Postscript file formatting information for the DCS master file (128, 130, 132 or 134) is then written to the data storage 12, which includes some of the formatting information retrieved in Block 244 (Block 246). The appropriate single plate image data (C,M,Y or K) is retrieved and compressed by the data compressor 38 (Block 248). The compressed single plate image data (C, M, Y, or K) is saved to the appropriate DCS master file (128, 130, 132 or 134) (Block 250). A postscript end of file marker is then written out to the appropriate DCS master file (128, 130, 132 or 134) (Block 252). The master generator 34 sets C, M, Y or K master file pointer 160, 162, 164 or 166, stored in the main master file 110 to point to the corresponding C, M, Y or K master file 128, 130, 132 or 134 (Block 253). The master generator 34 then loops back to repeat Blocks 244–253 for each DCS master file (128, 130, 132 or 134) (Block 254).

Figure 8E:
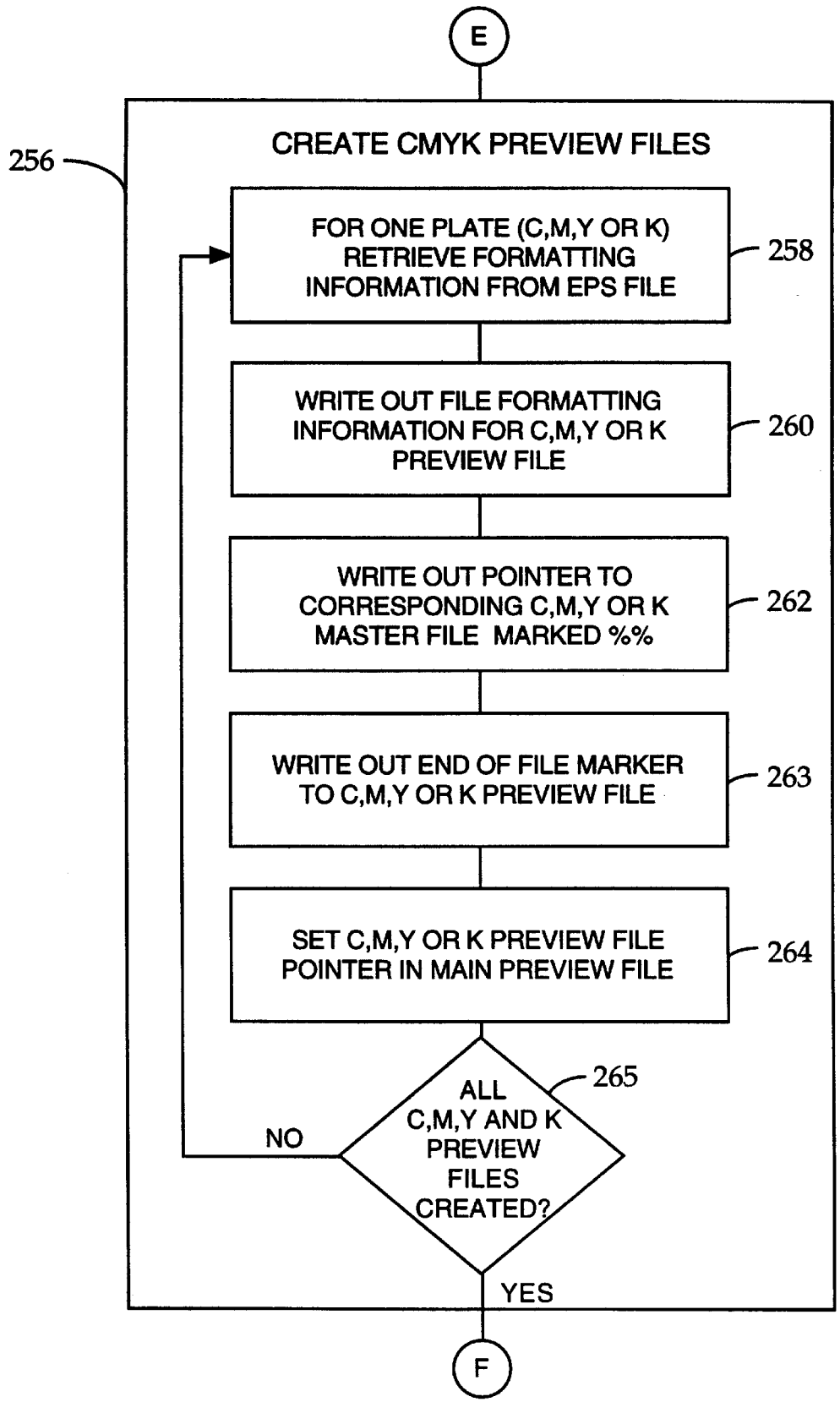
Figure 8F:
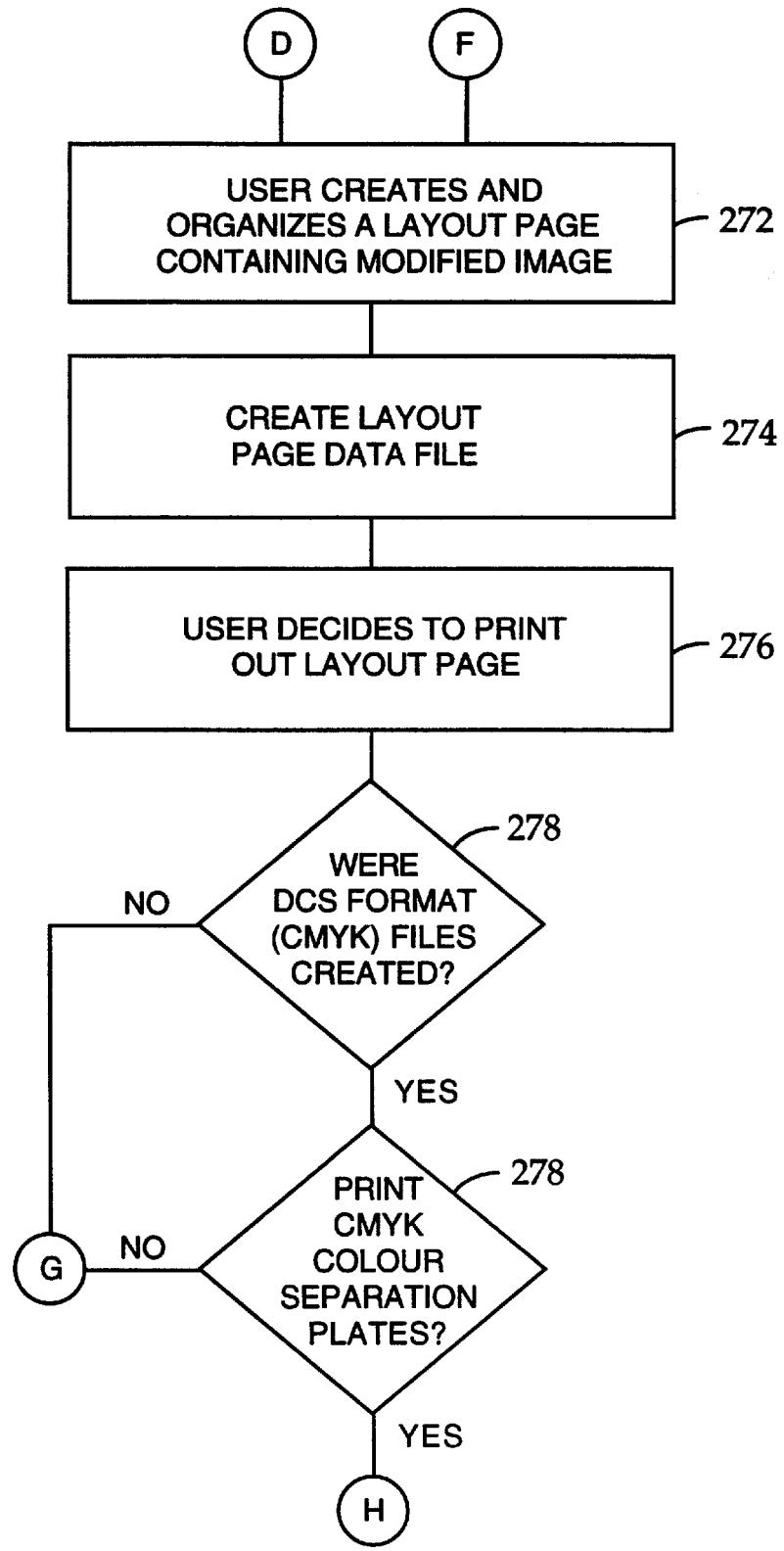
Figure 8G:
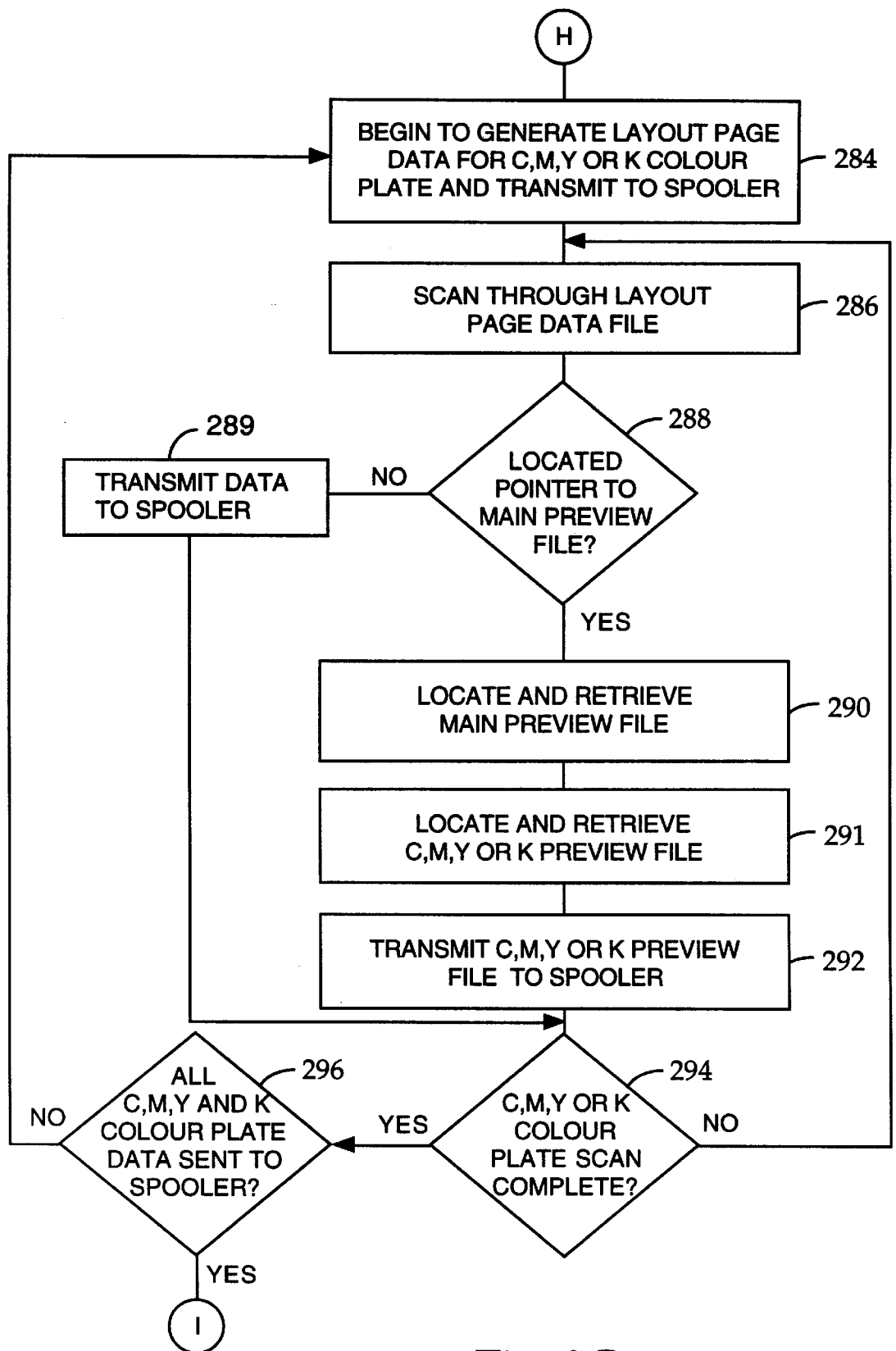
Figure 8H:
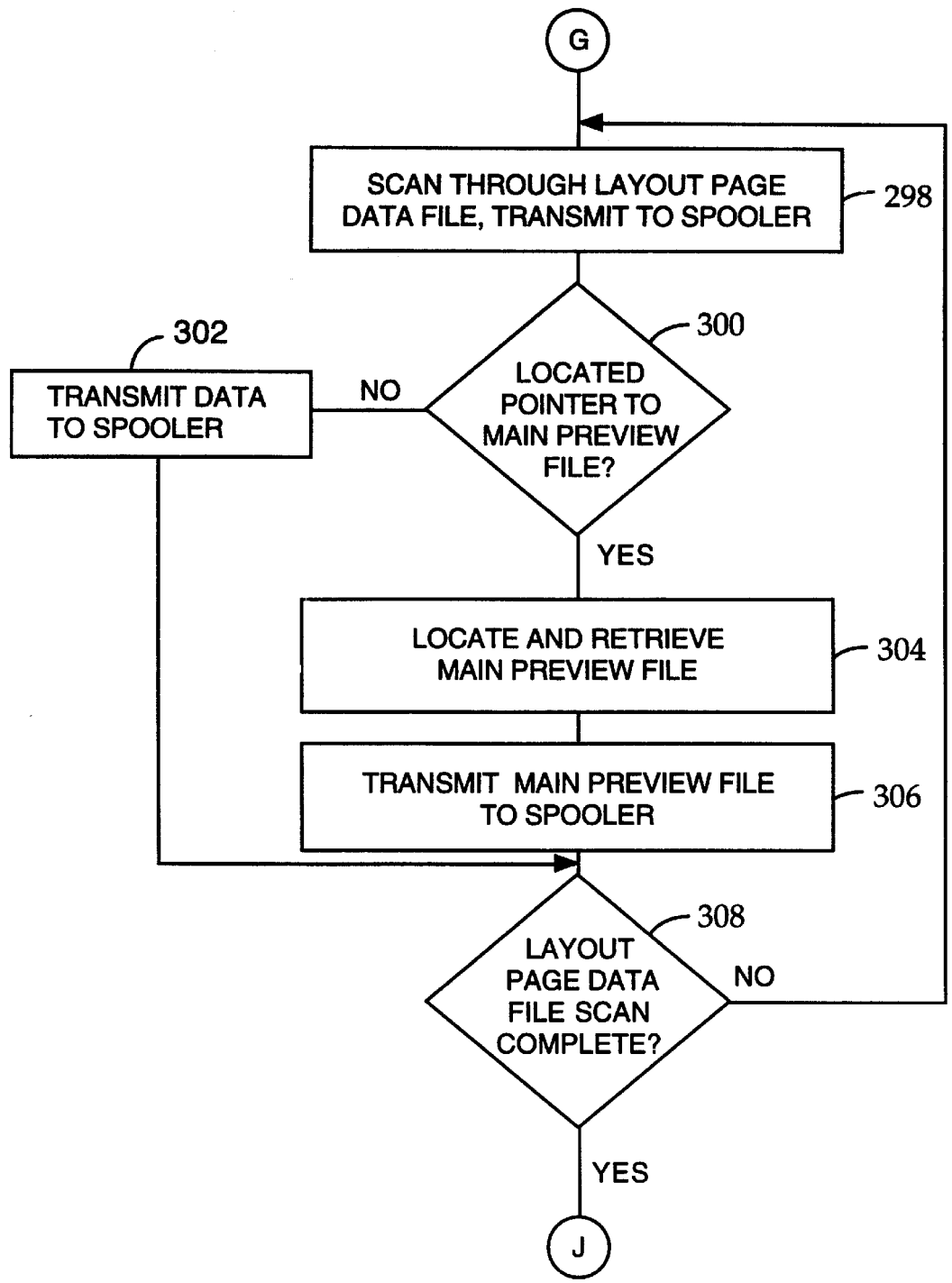
Figure 8I:
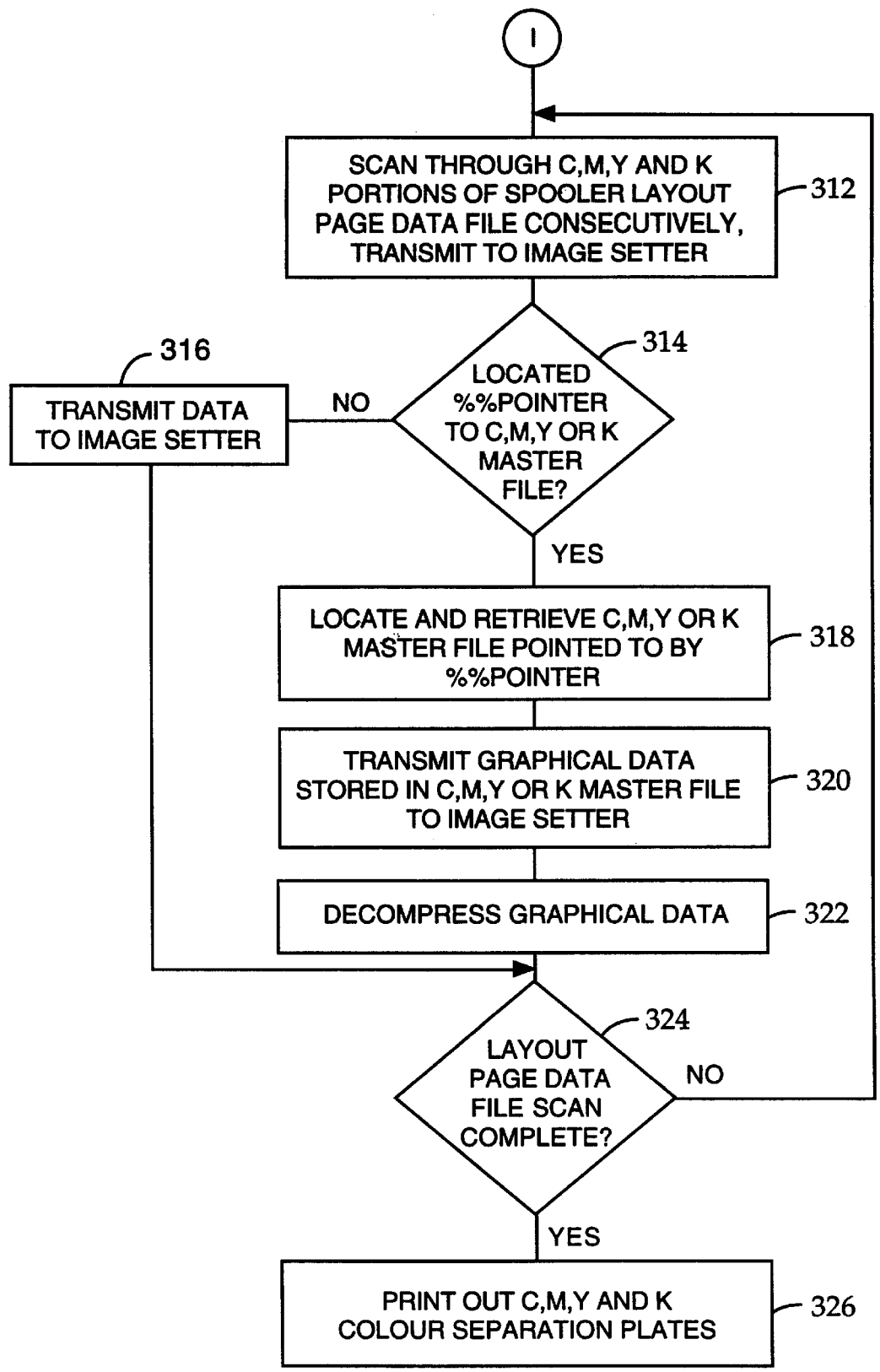
Figure 8J:
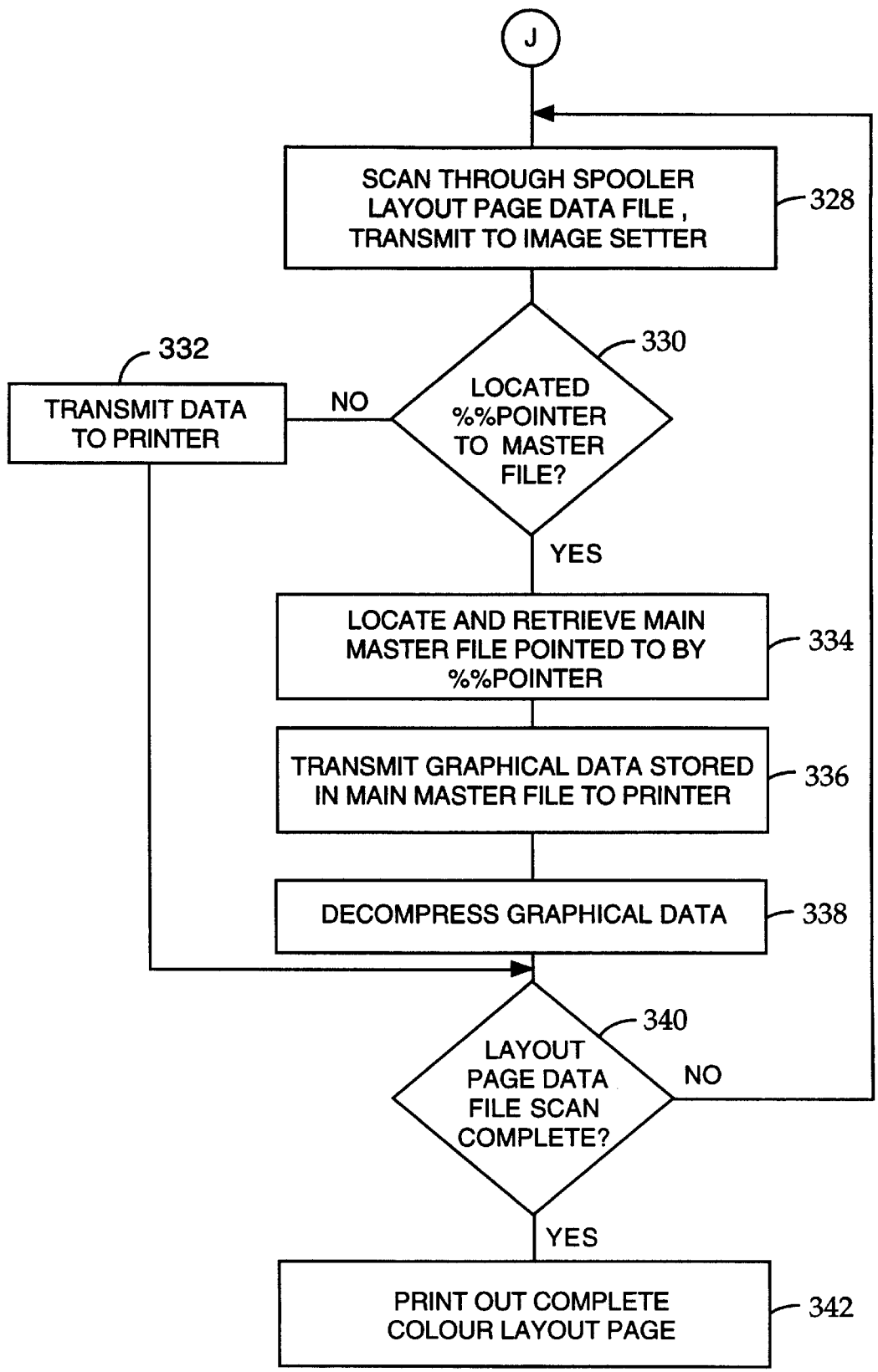

As shown in FIG. 8E, the preview generator 36 begins the process of generating DCS preview files (C preview file 136, M preview file 138, Y preview file 140, K preview file 142) for each CMYK colour plate (Block 256). For one DCS preview file (136, 138, 140 or 142), preview generator 36 retrieves formatting information from the EPS (RGB) format graphics file 70 (Block 258). Postscript file formatting information for the DCS preview file (136, 138, 140 or 142) is then written to the data storage 12, which includes some of the formatting information retrieved in Block 258 (Block 260). A pointer (144, 146, 148 or 150) is written to the DCS preview file (136, 138, 140 or 142) which points to the corresponding DCS master file (128, 130, 132 or 134) and is specially marked with a "% %" indicator (Block 262). An end of file marker is then written to the DCS preview file (136, 138, 140 or 142) (Block 263). C, M, Y or K preview file pointer 152, 154, 156 or 158 in the main preview file 120 is then set to point to the corresponding DCS preview file (136, 138, 140 or 142) (Block 264). Preview generator 36 loops back to repeat Blocks 258–264 for each DCS preview file (136, 138, 140 and 142) (Block 265).

The complete set of files for the image now comprises the main master file 110, the main preview file 120, the master files 160–166, and the preview files 152–158. This set of files has the functionality of combined EPS (RGB) and DCS formats. In the data fork 114 it includes full composite colour graphical data. Simultaneously, it includes a CMYK version of the image stored as separate CMYK plates 128, 130, 132 and 134, and as CMYK preview files 136, 138, 140 and 142. Both the main master file 100 and main preview files 120 include thumbnail images in their resource forks.

If the user wishes to modify the image this is done readily, and any changes are effected on both the EPS and DCS versions of the image. Thus, typically, if the user is viewing the EPS thumbnail version of the image on a computer monitor, any changes to the image are made to this EPS version. As these changes are saved to data storage 12, they are automatically effected to the CMYK version and corresponding changes made to the CMYK master files 128, 130, 132 and 134. The thumbnail image in EPS is also continuously modified or updated.

Figure 7A:
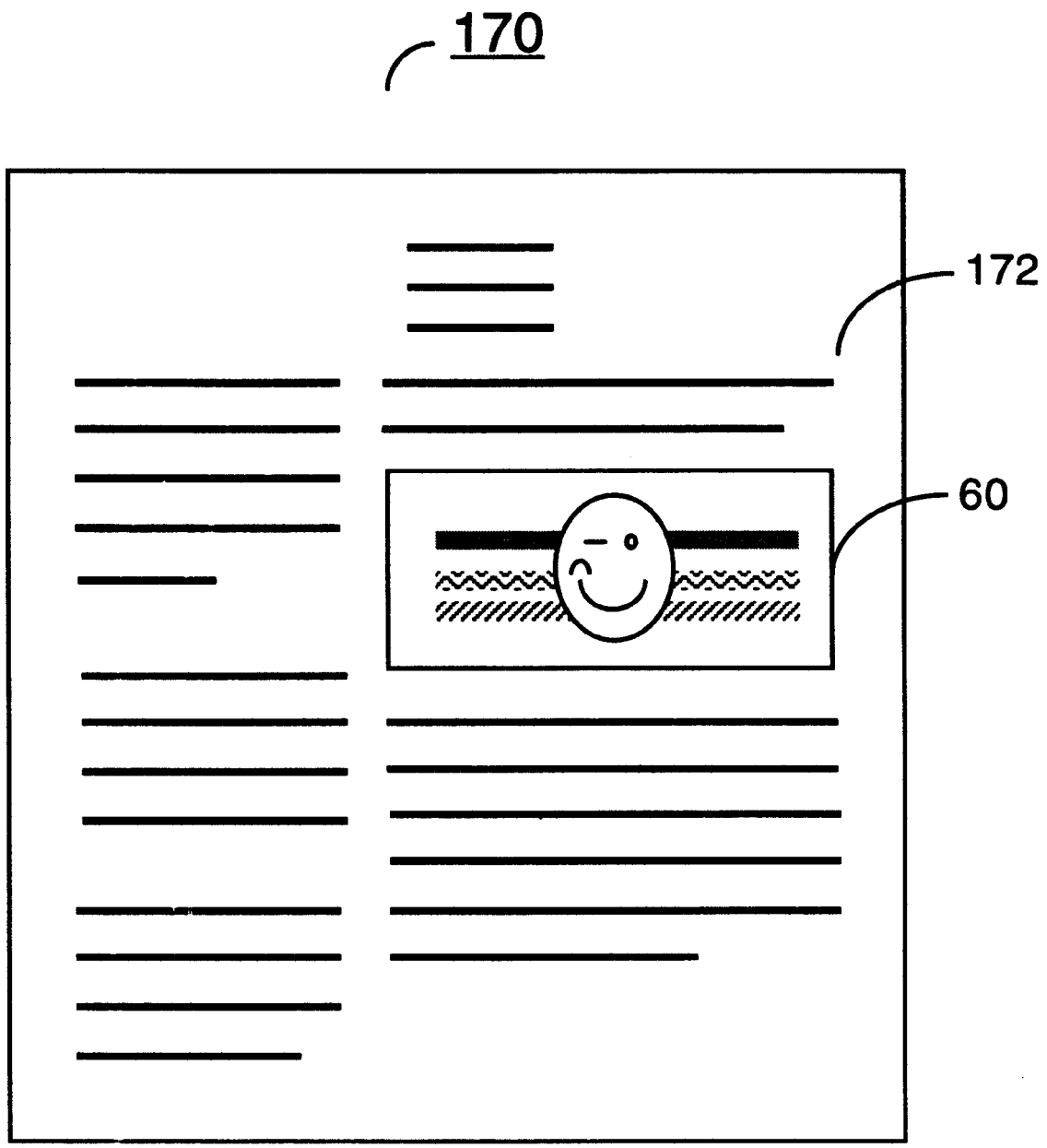
FIG. 7a is an example of a layout page incorporating the graphical image of FIG. 2b generated in accordance with the subject invention.
Figure 7B:
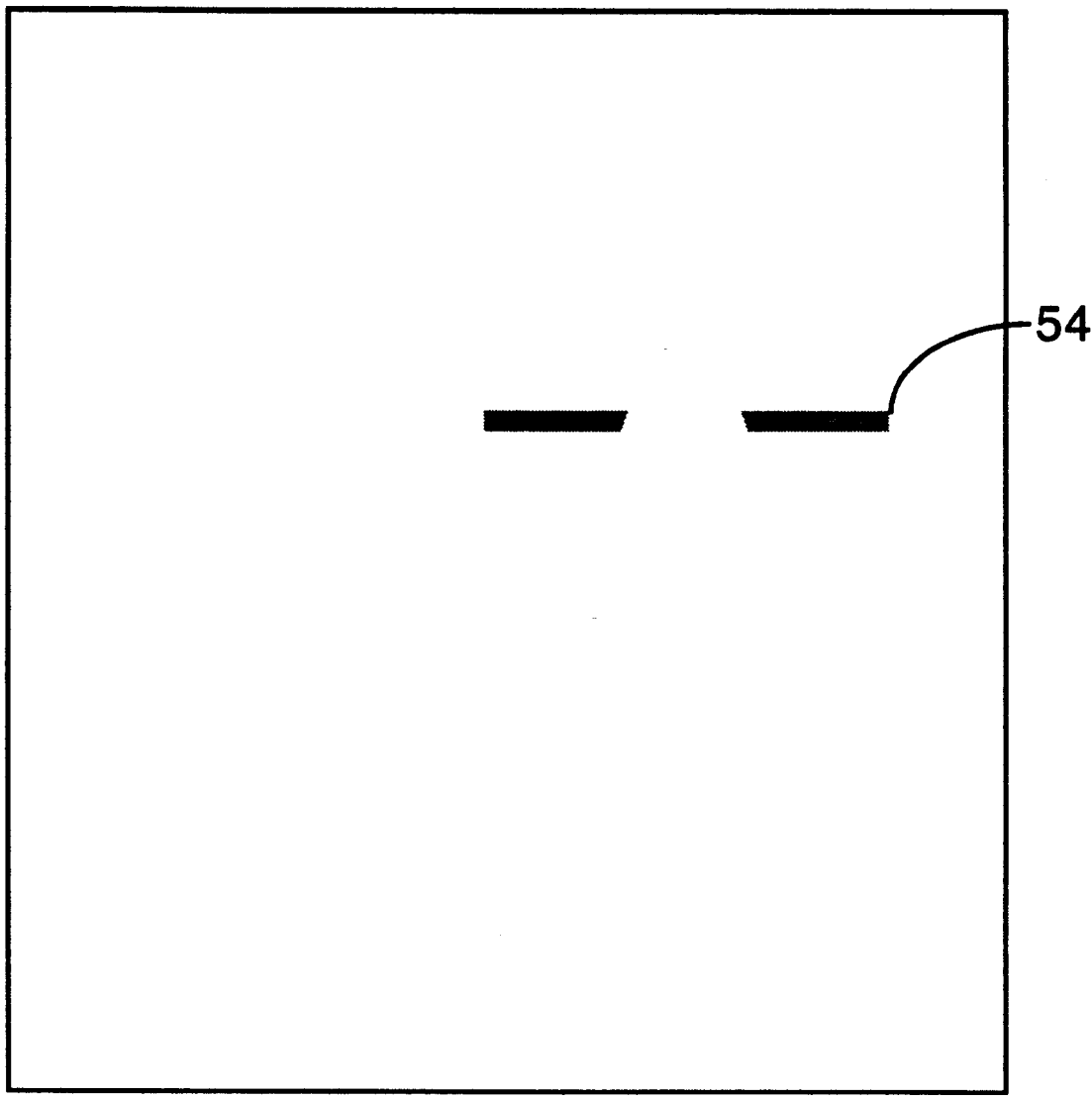
FIG. 7b is an example of a Cyan colour separation printout of the layout page of FIG. 7a generated in accordance with the subject invention.
Figure 7C:
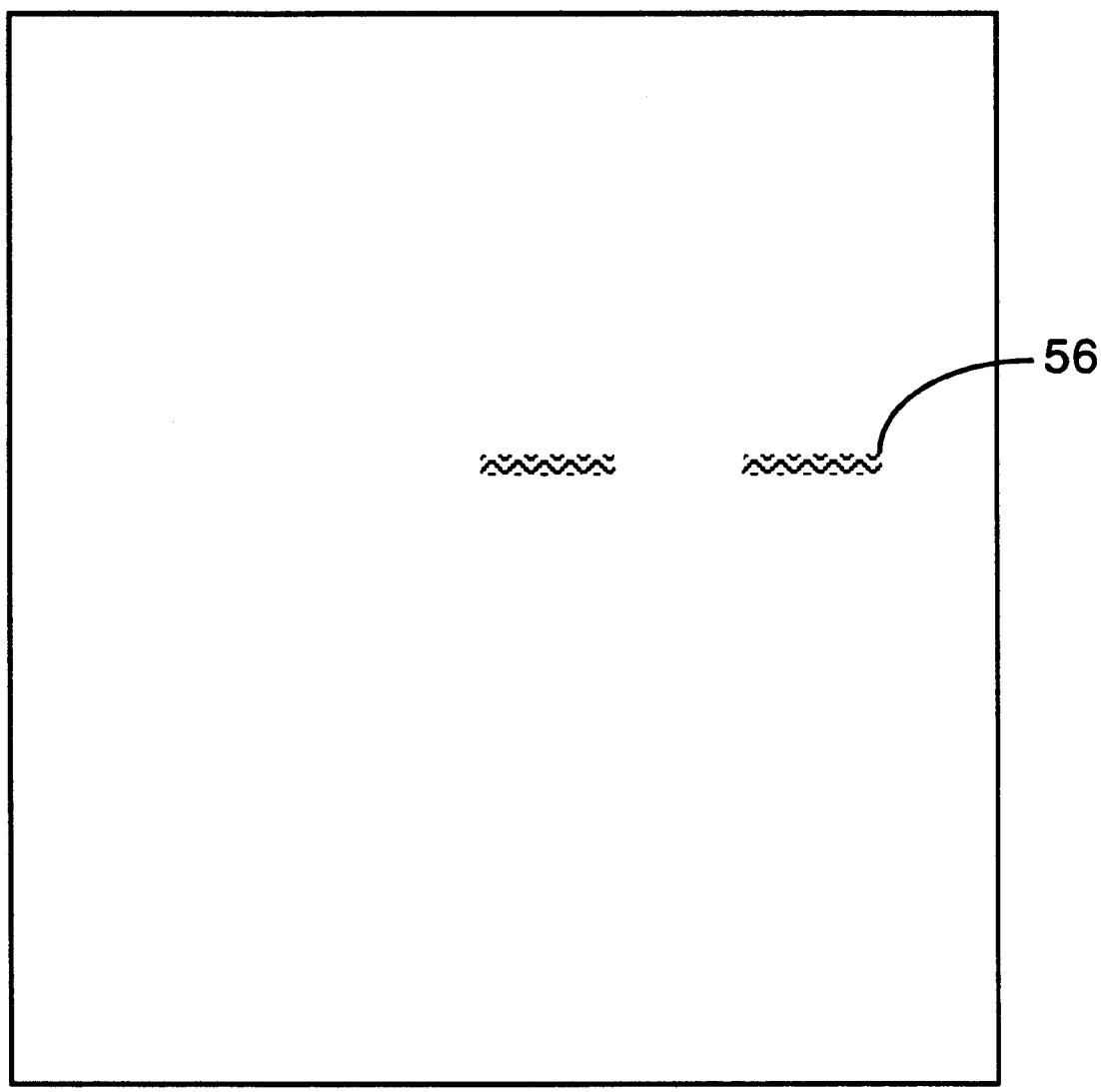
FIG. 7c is an example of a Magenta colour separation printout of the layout page of FIG. 7a generated in accordance with the subject invention.
Figure 7D:
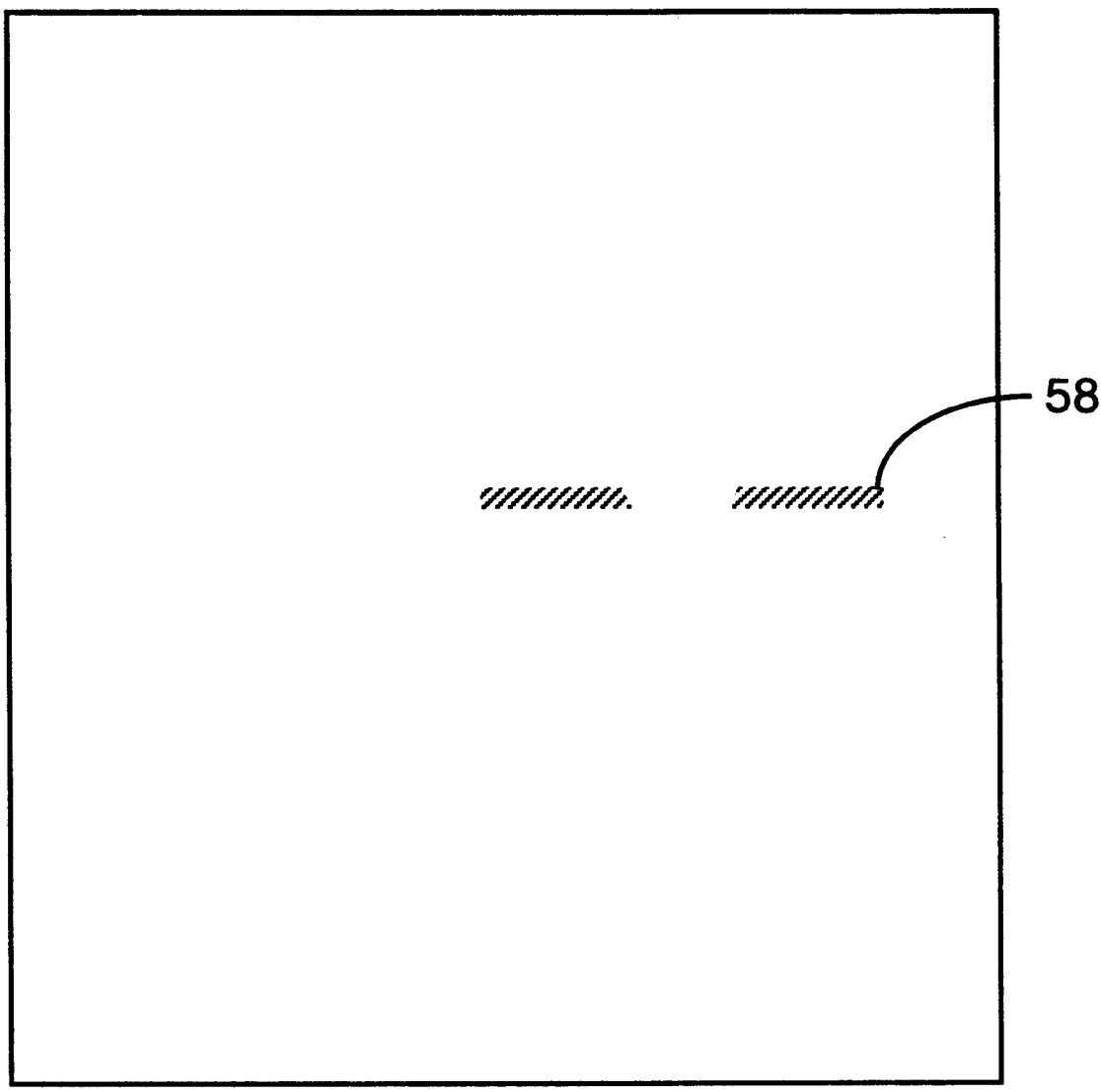
FIG. 7d is an example of a Yellow colour separation printout of the layout page of FIG. 7a generated in accordance with the subject invention.
Figure 7E:
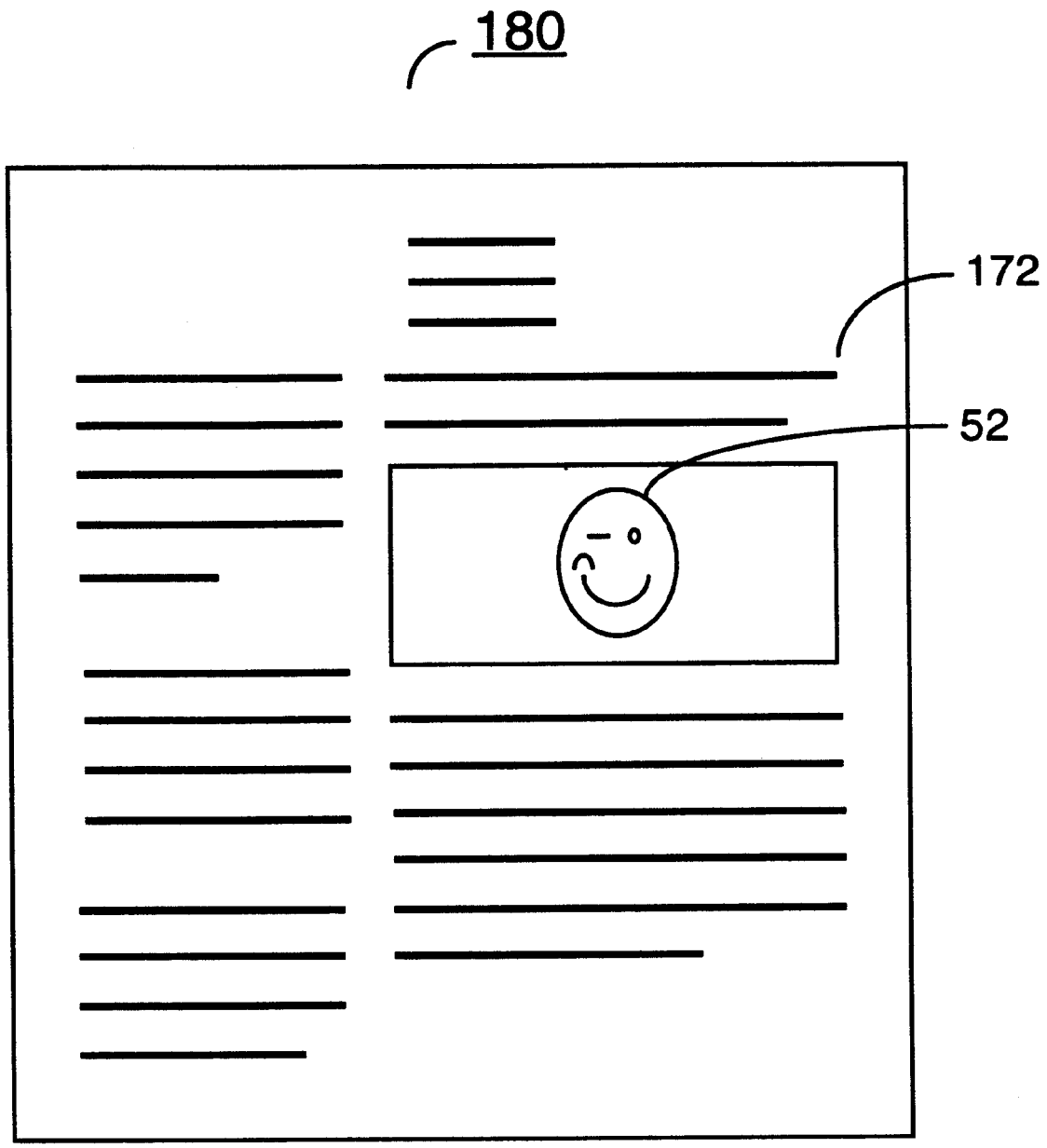
FIG. 7e is an example of a Black colour separation printout of the layout page of FIG. 7a generated in accordance with the subject invention.

The user then utilizes the layout page creator 18 to generate a layout page, referred to generally as 170 in FIG. 7a, containing the modified image 60 and text referred to generally as 172 (Block 272) in FIG. 8F. To accomplish this, the user inputs layout instructions to the layout page creator 18 using the keyboard 26 and the mouse 28 of the computer 14. When laying out the various elements (such as modified image 60 and text 172) of the layout page 170, any graphical elements, such as modified image 60, are displayed by the computer 14 on the computer screen 24 utilizing the thumbnail data of the graphical element, for example as stored in the resource fork 122 of the main preview file 120. This thumbnail image as displayed on the computer screen 24 and the thumbnail data is of sufficient quality to allow the user to perform the necessary positioning and cropping adjustments. Once the user has completed laying out the various elements of the layout page 170, the layout page creator 18 generates and stores in data storage 12 a layout page data file 182 containing the various formatting instructions input by the user relating to each element of the layout page 170, including the modified image 60 and text 172 (Block 274). For graphical elements, such as modified image 60, the layout page data file 182 does not contain the actual graphical data, for example, as contained in the data fork 114 of main master file 110. Instead, the layout page data file 182 merely contains a pointer 184, for example, pointing to the location of the main preview file 120 in data storage 12.

Once the user decides to print the layout page 170 (Block 276), layout page creator 18 determines whether DCS graphics files 80 have been generated for the modified image 60 by checking to see if pointers 152, 154, 156 and 158 are null, indicating that DCS graphics files 80 have not been created (Block 278).

If DCS graphics files have been created, the user must determine whether to print the CMYK colour plates, or a single complete colour image (Block 280). If the user decides to print a single complete colour image, the layout page creator 18 skips to Block 298. If the user decides to print the CMYK colour separation plates, layout page creator 18 then begins to generate layout page data which contains graphical information corresponding to each of the C, M, Y and K colour separation plates as displayed in FIGS. 7b, 7c, 7d and 7e respectively, and to transmit this data immediately to the spooler 20, which in turn stores this data in a spooler layout page data file 186a (Block 284). In a manner which is known in the art, layout page creator 18 automatically separates and only transmits graphical information to the spooler 20 for one C, M, Y or K colour plate at a time. Layout page creator 18 begins to scan through the layout page data file 182 (Block 286) in small sections at a time (Block 286). Layout page creator 18 checks the data in each small section prior to transmission to determine if it has located a pointer pointing to a main preview file (Block 288). If no such pointer is located, the data in the small section is transmitted to the spooler 20 (Block 289). If layout page creator 18 locates a pointer pointing to a main preview file, such as pointer 184 pointing to main preview file 120, it locates and retrieves the pointed-to main preview file (Block 290), and retrieves pointers 152–158 to CMYK preview files 144–150. Layout page creator 18 then retrieves relevant C, M, Y, or K preview file (Block 291). Instead of transmitting pointer 184 to the spooler 20, layout page creator 18 replaces and transmits the appropriate C, M, Y or K preview file (144, 146, 148 or 150) (Block 292). Layout page creator 18 continues the process of scanning and transmitting the data contained in the layout page data file 182 and replacing pointers until it has scanned through the entire layout page data file 182 and transmitted the complete graphical information for a single C, M, Y or K separation plate (Block 294).

The layout page creator 18 repeats the process in Blocks 284–294 until graphical information correlated to layout page 170 for each C, M, Y and K colour separation plate has been transmitted to spooler 20 (Block 296).

Transmitting just preview files leads to greatly increased speed from a user's perspective. The amount of data transmitted to the spooler is relatively small compared to the corresponding graphical data files, and hence transmission is relatively quick. This quickly frees up the computer 12 for further work. In due course, the spooler 20 will have to retrieve in full, each CMY and K plate, but the user is generally not concerned with how long this takes, and it does not affect the computer 12.

When only a single, complete colour image is to be printed, layout page creator 18 begins to scan through the layout page data file 182 in small sections at a time, immediately transmitting layout page data to the spooler 20, which in turn stores this data in a spooler layout page data file 186b (Block 298). Layout page creator 18 checks each small section of data prior to transmission to determine if it has located a pointer pointing to a main preview file (Block 300). If no such pointer is located, the section of data is transmitted to the spooler 20 (Block 302). If layout page creator 18 locates a pointer pointing to a main preview file, such as pointer 184 pointing to main preview file 120, it locates and retrieves the pointed-to main preview file (Block 304). Instead of transmitting pointer 184 to the spooler 20, layout page creator 18 transmits the main preview file 120 (Block 306). Layout page creator 18 continues the process of scanning the layout page data file 182 and replacing pointers until it has scanned through the entire layout page data file 182 and transmitted the complete graphical information for the layout page 170 to the spooler 20 (Block 308).

When separate C, M, Y and K colour separation plates are to be printed, for each colour plate (C, M, Y and K), spooler 20 begins to scan through the corresponding C, M, Y or K portion of the spooler layout page data file 186a in small sections and transmit the data to the image setter 42 (Block 312). Spooler 20 checks the sections of data prior to transmission to determine if it has located a pointer pointing to a master file and specifically indicated with a "% %" (Block 314). If no such pointer is located, the data is transmitted to the image setter 42 (Block 316). If spooler 20 locates a pointer pointing to a CMYK master file, such as pointers 144, 146, 148, 150 pointing to C master file 128, M master file 130, Y master file 132 and K master file 134 respectively, it locates and retrieves the appropriate master file (Block 318). Instead of transmitting pointer 144, 146, 148 or 150 to the image setter 42, spooler 20 transmits the graphical data stored in the C, M, Y or K master file 128, 130, 132 or 134 (Block 320). Data decompressor 44 decompresses this graphical data which was compressed in Block 248 (Block 322). Spooler 20 continues the process of scanning the spooler layout page data file 186a and replacing pointers until it has scanned through the spooler layout page data file 186a and transmitted the complete graphical information for the colour plate printouts 174, 176, 178 and 180, as displayed in FIGS. 7b, 7c, 7d and 7e respectively, to the image setter (Block 324). Image setter 42 then prints out the colour plate printouts 174, 176, 178, 180 (Block 326).

If a single, complete colour image is to be printed, spooler 20 begins to scan through the spooler layout page data file 186b in small sections and transmit the data to the printer 40 (Block 328). Spooler 20 checks the sections of data prior to transmission to determine if it has located a pointer pointing to a master file and specifically indicated with a "% %" (Block 330). If no such pointer is located, the data is transmitted to the printer 40 (Block 332). If spooler 20 locates a pointer pointing to a master file, such as pointer 126 pointing to main master file 110, it locates and retrieves the main master file 110 (Block 334). Instead of transmitting pointer 126 to the printer 40, spooler 20 transmits the graphical data stored in the data fork 114 of main master file 110 (Block 336). Data decompressor 44 decompresses this graphical data which was compressed in Block 226 (Block 338). Spooler 20 continues the process of scanning the spooler layout page data file 186b and replacing pointers until it has scanned through the spooler layout page data file 186b and transmitted the complete RGB graphical information for the single, complete colour layout page 170 to the printer 40 (Block 340). Printer 40 then prints out the layout page 170 (Block 342).

While the invention has been illustrated and described as utilizing an RGB graphical data format, it should be readily understood that with simple and obvious modifications, any graphical data format for storing data correlated to a single complete full-colour image may be used in the invention.

Similarly, while the invention has been illustrated and described as utilizing a DCS (CMYK) graphical data format, it should be readily understood that with simple and obvious modifications, any graphical data format for storing colour separation plate data correlated to a plurality of colour separation plates of an image may be used in the invention.

While the invention has been illustrated and described as producing a layout page containing a single graphical image, it should be readily understood that the layout page may contain a plurality of graphical images.

Thus, while what is shown and described herein constitutes preferred embodiments of the subject invention, it should be understood that various changes can be made without departing from the subject invention, the scope of which is defined in the appended claims.

We claim:

1. A computer readable storage medium including an image stored thereon in two different data storage formats;

wherein the image is stored in a first file including the image stored in a first format and a plurality of second files in which the image is stored in a second format wherein the first file includes a plurality of first pointers for the second files and pointing to the second files, with any one portion of the image being divided between all the second files, whereby to read the image in the second format, all of the second files are read;

wherein the first and second files behave as a single file and, for each application, an appropriate one of: the first file and the second file is selected and read, and wherein the first and second formats of the image are closely associated with one another;

wherein the first file comprises a main master data file, and the first format comprises a composite data file containing complete coloured data of the image;

wherein the second files comprise a plurality of colour plate data files, wherein each colour plate data file comprises data corresponding to the image and corresponding to a single colour from a set of colours; and wherein the storage medium includes thereon a preview file, which preview file includes a main master file pointer pointing to the main master file and a plurality of second pointers, each of which points to a respective one of the second files.

2. A storage medium as claimed in claim 1, wherein the master data file includes a resource fork including a thumbnail version of said image and the data fork which includes the complete colour data of the image and the first pointers.

3. A storage medium as claimed in claim 2, wherein the preview file includes a resource fork including a thumbnail version of the image and a data fork, which data fork includes the second pointers and the main master file pointer.

4. A storage medium as claimed in claim 3, which includes, for each colour and associated with the main preview file, an individual colour preview file, wherein each second pointer points to one of the individual colour preview files, and each individual colour preview file includes a subsidiary pointer pointing to the corresponding colour plate data file.

5. A system for generating, storing and transmitting graphical data of an image, the system comprising:

(a) data storage means for storing the graphical data;
   (b) graphics manipulation means operationally connected to the data storage means for inputting and manipulating the graphical data to create modified graphical data, comprising:
      (i) means for inputting and outputting the graphical data to and from the graphics manipulation means;
      (ii) data manipulation means for manipulating and modifying the graphical data;
      (iii) master data file generating means for generating a master data file comprising the manipulated graphical data and storing the master data file in the data storage means as a first file including the image stored in a first format and a plurality of second files including the image stored in a second format, which collectively form the image, wherein any one portion of the image is divided between the second files, and wherein to read the image in the second format, all of the second files are read: wherein the first file includes a plurality of first pointers pointing to the second files and wherein the first and second files behave as a single file and, for each application, an appropriate one of: the first file; and the second file is selected and read; wherein the first format comprises a composite data file containing complete colour data corresponding to the image and wherein the second files of the second format each comprise a colour plate data file comprising graphical data correlated to the graphical image and related to a single colour from a set of colours;
      (iv) preview data file generating means for generating a preview data file stored in the data storage means and comprising a master file pointer pointing to the master date file and a plurality of second pointers pointing to the second files;
   wherein the master data file includes a resource fork including a thumbnail version of the image, and wherein the preview data file includes resource and data forks with the master file pointer and the second pointers being included in the data fork of the preview file and the resource fork of the preview data file including a thumbnail version of the image.

6. A system as claimed in claim 5, which includes: a layout page creation means operationally connected to the data storage means for creating and outputting layout page data comprising data correlated to the preview data file; and a spooling means operationally connected to the layout page creation means for receiving layout page data and creating adjusted layout page data by replacing data received from the preview data file with data from one of the first file and the second files, and for outputting the adjusted layout page data; and a main computer means operationally connected to the graphics manipulation means, the data storage means, the layout page creation means and the spooling means for control thereof.

7. A system as claimed in claim 6, which includes printer means comprising at least one printing device selected from the set comprising printers and image setters, the printer means being connected to the spooling means.

8. A system as claimed in claim 7, wherein the spooling means includes means for replacing pointers with the corresponding files.

9. A system as claimed in claim 8, wherein the master file generating means includes data compression means for compressing the manipulated graphical data and the printer means includes data decompression means for decompressing the manipulated graphical data.

10. A system as claimed in claim 9, wherein the first format comprises the EPS format and the second format comprises the DCS format and wherein the printer means includes at least one printer capable of receiving data files formatted in an EPS format and at least one image setter capable of receiving data files formatted in the DCS format.

11. A method of generating and storing graphical data of an image, the method comprising the following steps:

(1) inputting the graphical data and generating a first master data file including the image stored in a first file format and comprising a composite data file containing a complete colour data corresponding to the image;

(2) generating a plurality of second files which collectively store the image in the second format and each of which comprises colour plate data files related to the image and each comprising a single colour from a set of colours;

(3) providing a plurality of first pointers in the first file pointing to the second files;

(4) modifying the first file so that the first and second files behave as a single file and, for each application, an appropriate one of the first and second files is selected and read, and so that the first and second formats of the image are closely associated with one another.

(5) generating and storing a preview data file corresponding to the first master data file and including a master file pointer pointing to the master data file; and (6) providing for the preview data file a preview colour data file for each colour plate data file, a plurality of second pointers pointing to the preview colour data files, each preview colour plate data file comprising a further pointer pointing to the respective colour plate data file.

12. A method as claimed in claim 11, which includes the following additional steps:

(5) creating data for a layout page, including the image; and (6) at a spooling means, receiving the layout page data and creating adjusted layout page data by replacing data from the preview data file with data from one of the first file and second files.

13. A method as claimed in claim 12, wherein step (6) includes detecting pointers in the preview data file and replacing the data corresponding to the preview data file by data corresponding to one of the first file and the second files pointed to by the pointers in the preview data file to create the adjusted layout page data.

* * * * *